(12) United States Patent
Herrmann et al.

(10) Patent No.: US 12,342,823 B2
(45) Date of Patent: Jul. 1, 2025

(54) ACTIVE COMPOUND COMBINATIONS HAVING INSECTICIDAL/ACARICIDAL PROPERTIES

(71) Applicant: Bayer Aktiengesellschaft, Leverkusen (DE)

(72) Inventors: Stefan Herrmann, Langenfeld (DE); Reiner Fischer, Monheim (DE); Marita John, Bottrop (DE)

(73) Assignee: Bayer Aktiengesellschaft, Leverkusen (DE)

( * ) Notice: Subject to any disclaimer, the term of this patent is extended or adjusted under 35 U.S.C. 154(b) by 1009 days.

(21) Appl. No.: 17/414,827

(22) PCT Filed: Dec. 16, 2019

(86) PCT No.: PCT/EP2019/085251
§ 371 (c)(1),
(2) Date: Jun. 16, 2021

(87) PCT Pub. No.: WO2020/126980
PCT Pub. Date: Jun. 25, 2020

(65) Prior Publication Data
US 2022/0061323 A1     Mar. 3, 2022

(30) Foreign Application Priority Data

Dec. 18, 2018   (EP) ..................................... 18213341
Apr. 17, 2019   (EP) ..................................... 19169751

(51) Int. Cl.
*A01N 43/90*   (2006.01)
*A01P 1/00*    (2006.01)
*A01P 5/00*    (2006.01)
*A01P 7/02*    (2006.01)
*A01P 7/04*    (2006.01)

(52) U.S. Cl.
CPC ................ *A01N 43/90* (2013.01); *A01P 1/00* (2021.08); *A01P 5/00* (2021.08); *A01P 7/02* (2021.08); *A01P 7/04* (2021.08)

(58) Field of Classification Search
CPC ...................................................... A01N 43/90
See application file for complete search history.

(56) References Cited

U.S. PATENT DOCUMENTS

| 5,591,429 A | 1/1997 | Wilson et al. |
| 6,406,690 B1 | 6/2002 | Peleg et al. |
| 6,589,976 B1 | 7/2003 | Fischer et al. |
| 7,897,543 B2 | 3/2011 | Bretschneider et al. |
| 8,241,889 B2 | 8/2012 | Schisler et al. |
| 2004/0102327 A1 | 5/2004 | Hagemann et al. |
| 2005/0214336 A1 | 9/2005 | Hansen et al. |
| 2008/0305955 A1 | 12/2008 | Bretschneider et al. |
| 2010/0311677 A1 | 12/2010 | Fischer et al. |
| 2011/0009260 A1 | 1/2011 | Stewart |
| 2011/0190493 A1 | 8/2011 | Bretschneider et al. |
| 2011/0301030 A1 | 12/2011 | Colavizza et al. |

FOREIGN PATENT DOCUMENTS

| DE | 19716591 A1 | 3/1998 |
| WO | 2006/089633 A2 | 8/2006 |
| WO | 2009/039951 A2 | 4/2009 |
| WO | 2011/117351 A1 | 9/2011 |
| WO | 2012/087980 A1 | 6/2012 |
| WO | 2012/140207 A2 | 10/2012 |
| WO | 2014/053398 A1 | 4/2014 |
| WO | 2014/079769 A1 | 5/2014 |

OTHER PUBLICATIONS

Park, et al. Scientific Reports 7, Article No. 40902 (2017).*
International Search Report of International Patent Application No. PCT/EP2019/085251, mailed Feb. 7, 2020.

\* cited by examiner

*Primary Examiner* — Shawquia Jackson

(57) ABSTRACT

The present invention relates to novel active compound combinations comprising at least one known compound of the formula (I) and at least one further active compound of the formula (II), which combinations are highly suitable for controlling animal and microbial pests such as unwanted insects and/or unwanted acarids and/or unwanted nematodes.

13 Claims, No Drawings

ACTIVE COMPOUND COMBINATIONS HAVING INSECTICIDAL/ACARICIDAL PROPERTIES

CROSS-REFERENCE TO RELATED APPLICATIONS

This application is the National Stage entry of International Application No. PCT/EP2019/085251, filed 16 Dec. 2019, which claims priority to European Patent Application No. 18213341.3, filed 18 Dec. 2018 and European Patent Application No. 19169751.5, filed 17 Apr. 2019.

BACKGROUND

Field

The present invention relates to active compound combinations comprising firstly at least one compound of formula (I) as shown below and secondly at least one active compound of group (II) selected from Biological Control Agent (BCA) Groups (1) to (7). Such combinations are highly suitable for controlling animal and microbial pests, such as unwanted insects and especially acarids (mites), and as plant strengthening agents.

A Description of Related Art

The compounds of formula (I) and methods for its production are known from WO 2006/089633 and their insecticidal action has been described.

However, the acaricidal and/or insecticidal efficacy and/or the activity spectrum and/or the compatibility of the known compounds with plants, especially with respect to crop plants, is not always satisfactory.

Therefore, novel active compound combinations with improved properties are in great demand.

SUMMARY

It has now been found that an active compound combination comprising at least one compound of the formula (I)

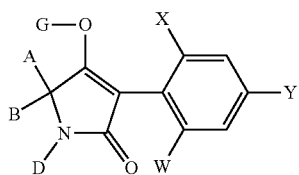

(I)

in which
W und Y independently of one another represent hydrogen, $C_1$-$C_4$-alkyl, chlorine, bromine, iodine or fluorine,
X represents $C_1$-$C_4$-alkyl, $C_1$-$C_4$-alkoxy, chlorine, bromine, iodine or fluorine,
D represents hydrogen or methyl,
A and B and the carbon atom to which they are attached represent $C_3$-$C_6$-cycloalkyl in which optionally one ring atom is replaced by a nitrogen and optionally monosubstituted by $C_1$-$C_4$-alkoxy or
A, B and the carbon atom to which they are attached represent $C_3$-$C_6$-cycloalkyl which is substituted by a $C_1$-$C_4$-alkyl- or a $C_1$-$C_4$-alkoxy-$C_1$-$C_2$-alkyl-substituted alkylenedioxyl group which, together with the carbon atom to which it is attached, forms a five-membered or six-membered ketal,
G represents hydrogen (a) or represents one of the groups

(b)

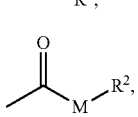

(c)

(d)

in which
E represents a metal ion or an ammonium ion,
M represents oxygen or sulphur,
$R^1$ represents straight-chain or branched $C_1$-$C_6$-alkyl,
$R^2$ represents straight-chain or branched $C_1$-$C_6$-alkyl,
and at least one active compound of group (II) which is selected from
Biological Control Agent (BCA) Groups (1) to (7),
is highly suitable for the control of animal and microbial pests as well as plant strengthening agent.

Especially, such active compound combinations have very good insecticidal, acaricidal and nematicidal properties.

DETAILED DESCRIPTION OF A PREFERRED EMBODIMENT

Such active compound combinations are very suitable for controlling animal and microbial pests such as insects and/or arachnids, especially acarids, and/or nematodes and/or fungi, and indirectly improve plant health. Further, such active compound combinations can be used for reducing overall damage of plants and plant parts as well as losses in harvested fruits or vegetables caused by such pests, e.g. insects, mites and phytopathogens. Further, such active compound combinations are suitable as plant strengthening agents.

For some active compound combinations according to the invention, it might be possible that the insecticidal effect and/or arachnicidal/acaricidal effect and/or nematicidal effect and/or antimicrobial effect and/or the fungicidal effect and/or the plant-strengthening effect and/or the yield-increasing effect is substantially higher than the sum of the effects of the individual active ingredients. For such active compound combinations a synergistic effect will be present.

Group II consists of
Biological Control Agent (BCA) Groups (1) to (7).
Biological Control Agent (BCA) Groups:
Biological control agents are, in particular, bacteria, fungi or yeasts, protozoa, viruses, entomopathogenic nematodes, products produced by microorganisms including proteins or secondary metabolites and botanicals, especially botanical extracts. Therefore, the Biological Control Agent (BCA) Groups (1) to (7) according to the invention are:
BCA Group (1): bacteria
BCA Group (2): fungi or yeasts
BCA Group (3): protozoa
BCA Group (4): viruses
BCA Group (5): entomopathogenic nematodes BCA Group (6): products produced by microorganisms including proteins or secondary metabolites BCA Group (7): botanicals, especially botanical extracts.

These Biological Control Agent (BCA) Groups (1) to (7) are further characterized as follows:

(1) According to the invention biological control agents which are summarized under the term "bacteria" include but are not limited to spore-forming, root-colonizing bacteria, or bacteria useful as bioinsecticide, biofungicide or bionematicide. Such bacteria to be used or employed according to the invention include but are not limited to:

(1.1) *Agrobacterium radiobacter*, in particular strain K84 (product known as Galltrol-A from AgBioChem, CA) or strain K1026 (product known as Nogall from Becker Underwood, US), (1.2) *Agrobacterium vitis*, in particular the non-pathogenic strain VAR03-1, (1.3) *Azorhizobium caulinodans*, preferably strain ZB-SK-5, (1.4) *Azospirillum amazonense*, (1.5) *Azospirillum brasilense*, (1.6) *Azospirillum halopraeference*, (1.7) *Azospirillum irakense*, (1.8) *Azospirillum lipoferum*, (1.9) *Azotobacter chroococcum*, preferably strain H 23 (CECT 4435) (cf. Applied Soil Ecology 12 (1999) 51±59), (1.10) *Azotobacter vinelandii*, preferably strain ATCC 12837 (cf. Applied Soil Ecology 12 (1999) 51±59), (1.11) *Bacillus* sp. strain AQ175 (ATCC Accession No. 55608), (1.12) *Bacillus* sp. strain AQ177 (ATCC Accession No. 55609), (1.13) *Bacillus* sp. strain AQ178 (ATCC Accession No. 53522), (1.14) *Bacillus acidocaldarius*, (1.15) *Bacillus acidoterrestris*, (1.16) *Bacillus agri* (cf. WO 2012/140207), (1.17) *Bacillus aizawai* (cf. WO 2012/140207), (1.18) *Bacillus albolactis* (cf. WO 2012/140207), (1.19) *Bacillus alcalophilus*, (1.20) *Bacillus alvei*, (1.21) *Bacillus aminoglucosidicus*, (1.22) *Bacillus aminovorans*, (1.23) *Bacillus amylolyticus* (also known as *Paenibacillus amylolyticus*), (1.24) *Bacillus amyloliquefaciens*, in particular strain IN937a (cf. WO 2012/140207), or strain FZB42 (DSM 231179) (product known as Rhizo-Vital® from ABiTEP, DE), or strain B3, or strain D747, (products known as Bacstar® from Etec Crop Solutions, NZ, or Double Nickel™ from Certis, US), (1.25) *Bacillus aneurinolyticus*, (1.26) *Bacillus atrophaeus*, (1.27) *Bacillus azotoformans*, (1.28) *Bacillus badius*, (1.29) *Bacillus cereus* (synonyms: *Bacillus endorhythmos, Bacillus medusa*), in particular spores of *B. cereus* strain CNCM I-1562 (cf. U.S. Pat. No. 6,406,690), or strain BP01 (ATCC 55675), (products known as Mepichlor from Arysta, US or Mepplus, Micro-Flo Company LLC, US), (1.30) *Bacillus chitinosporus*, in particular strain AQ746 (Accession No. NRRL B-21618), (1.31) *Bacillus circulans* (1.32) *Bacillus coagulans*, in particular strain TQ33, (1.33) *Bacillus fastidiosus*, (1.34) *Bacillus firmus*, in particular strain I-1582 (products known as Bionem or VOTIVO from Bayer CropScience), (1.35) *Bacillus kurstaki*, (1.36) *Bacillus lacticola*, (1.37) *Bacillus lactimorbus*, (1.38) *Bacillus lactis*, (1.39) *Bacillus laterosporus* (also known as *Brevibacillus laterosporus*), (product known as Bio-Tode from Agro-Organics, SA), (1.40) *Bacillus lautus*, (1.41) *Bacillus lentimorbus*, (1.42) *Bacillus lentus*, (1.43) *Bacillus licheniformis*, in particular strain SB3086 (product known as EcoGuard™ Biofungicide or Green Releaf from Novozymes Biologicals, US), (1.44) *Bacillus maroccanus*, (1.45) *Bacillus medusa*, (1.46) *Bacillus megaterium*, (products known as Bioarc®, from BioArc), or *B. megaterium* strain YFM3.25, (1.47) *Bacillus metiens*, (1.48) *Bacillus mojavensis*, in particular strain SR11 (CECT-7666), (1.49) *Bacillus mycoides*, in particular strain AQ726 (Accession No. NRRL B21664) or isolate J, (product known as BmJ from Certis USA), (1.50) *Bacillus nematocida*, (1.51) *Bacillus nigrificans*, (1.52) *Bacillus popilliae*, (product known as Cronox from Bio-Crop, CO), (1.53) *Bacillus psychrosaccharolyticus*, (1.54) *Bacillus pumilus*, in particular strain GB34 (Accession No. ATCC 700814), (products known as Yield Shield® from Bayer Crop Science, DE), and strain QST2808 (Accession No. NRRL B-30087), (products known as Sonata QST 2808® from Bayer Crop Science), or strain BU F-33, (product known as Integral F-33 from Becker Underwood, US), or strain AQ717 (Accession No. NRRL B21662), (1.55) *Bacillus siamensis*, in particular strain KCTC 13613T, (1.56) *Bacillus smithii*, (1.57) *Bacillus sphaericus*, in particular Serotype H5a5b strain 2362, (product known as VectoLex® from Valent BioSciences, US), (1.58) *Bacillus subtilis*, in particular strain GB03 (Accession No. ATCC SD-1397), (product known as Kodiak® from Bayer Crop Science, DE), and strain QST713/AQ713 (Accession No. NRRL B-21661), (products known as Serenade QST 713®, Serenade Soil and Serenade Max from Bayer Crop Science) and strain AQ 153 (ATCC accession No. 55614), and strain AQ743 (Accession No. NRRL B-21665), and strain DB 101, (products known as Shelter from Dagutat Bio lab, ZA), and strain DB 102, (product known as Artemis from Dagutat Bio lab, ZA), and strain MBI 600, (products known as Subtilex from Becker Underwood, US), or *B. subtilis* var. *amyloliquefaciens* strain FZB24, (product known as Taegro® from Novozymes, US), or *B. subtilis* subspecies natto (formerly *B. natto*), or *B. subtilis* isolate B246, (product known as Avogreen from RE at UP) or strain MBI600 (products known as Subtilex or HiStick N/T from Becker Underwood), or strain QST30002/AQ30002 (Accession No. NRRL B-50421, cf. WO 2012/087980), or strain QST30004/AQ30004 (Accession No. NRRL B-50455, cf. WO 2012/087980), (1.59) *Bacillus tequilensis*, in particular strain NII-0943, (1.60) *Bacillus thuringiensis*, in particular *B. thuringiensis* subspecies *israelensis* (serotype H-14), strain AM65-52 (Accession No. ATCC 1276), (product known as VectoBac® from Valent BioSciences, US), or *B. th. israelensis* strain BMP 144, (product known as Aquabac from Becker Microbial Products IL), or *B. thuringiensis* subsp. *aizawai*, in particular strain ABTS-1857 (SD-1372), (products known as XenTari® from Bayer Crop Science, DE) or strain GC-91 (Accession No. NCTC 11821), or serotype H-7, (product known as Florbac WG from Valent BioSciences, US), or *B. thuringiensis* subsp. *kurstaki* strain HD-1, (product known as Dipel® ES from Valent BioSciences, US), or strain BMP 123 from Becker Microbial Products, IL, or strain ABTS 351 (Accession No. ATCC SD-1275), or strain PB 54 (Accession No. CECT 7209), or strain SA 11 (Accession No. NRRL B-30790), or strain SA 12 (Accession No. NRRL B-30791), or strain EG 2348 (Accession No. NRRL B-18208), or strain EG-7841 (product known as Crymax from Certis USA), or *B. thuringiensis* subsp. *tenebrionis* strain NB 176 (SD-5428), (product known as Novodor® FC from BioFa DE), or *B. thuringiensis* subspecies. *aegypti*, (product known as Agerin), or *B. thuringiensis* var. *colmeri* (product known as TianBaoBTc from Changzhou Jianghai Chemical Factory), or *B. thuringiensis* var. *darmstadiensis* strains 24-91 (product known as Baciturin), or *B. thuringiensis* var. *dendrolimus* (products known as Dendrobacillin), or *B. thuringiensis* subsp. *galleriae* (product known as GrubGone or BeetleGone from Phyllom BioProducts), or *B. thuringiensis* var. *japonensis* strain Buibui, or *B.thuringiensis* subsp. *morrisoni*, or *B. thuringiensis* var. *san diego* (product known as M-One® from Mycogen Corporation, US), or *B. thuringiensis* subsp. *thuringiensis* serotype 1, strain MPPL002, or *B. thuringiensis* var. *thuringiensis*, or *B. thuringiensis* var 7216 (product known as Amactic, Pethian), or *B. thuringiensis* var T36 (product known as Cahat) or *B. thuringiensis* strain BD #32 (Accession No. NRRL B-21530) from Bayer Crop Science, DE, or *B. thuringiensis* strain AQ52 (Accession No. NRRL B-21619) from Bayer Crop Science, DE, or *B. thuringiensis* strain CR-371 (Accession No. ATCC 55273), (1.61) *Bacillus uniflagellatus*, (1.62) *Bradyrhizobium japonicum* (product known as Optimize from Novozymes), (1.63) *Brevibacillus brevis* (formerly *Bacillus brevis*), (product known as Brevisin), in particular strains SS86-3, SS86-4, SS86-5, 2904, (1.64) *Brevibacillus laterosporus* (formerly *Bacillus laterosporus*), in particular strains ATCC 64, NRS 1111, NRS 1645, NRS 1647, BPM3, G4, NCIMB 41419, (1.65) *Burkholderia* spp., in particular strain A396 (Accession No. NRRL B-50319), (product known as MBI-206 TGAI from Marrone Bio Innovations), or *B. cepacia* (product known as Deny from Stine Microbial Products), (1.66) Chromobacterium subtsugae, in particular strain PRAA4-1T (MBI-203), (product known as Grandevo from Marrone Bio Innovations), (1.67) *Corynebacterium paurometabolum*, (1.68) *Delftia acidovorans*, in particular strain RAY209 (product known as BioBoost® from Brett Young Seeds), (1.69) *Gluconacetobacter diazotrophicus*, (1.70) *Herbaspirillum rubrisubalbicans*, (1.71) *Herbaspirillum seropedicae*, (1.72) *Lactobacillus* sp. (product known as Lactoplant from LactoPAFI), (1.73) *Lactobacillus acidophilus* (product known as Fruitsan from Inagrosa-Industrias Agrobiológicas, S.A), (1.74) *Lysobacter antibioticus*, in particular strain 13-1 (cf. Biological Control 2008, 45, 288-296), (1.75) *Lysobacter* enzymogenes, in particular strain C3 (cf. J Nematol. 2006 June; 38(2): 233-239), (1.76) *Paenibacillus alvei*, in particular strains III3DT-1A, 1112E, 46C3, 2771 (*Bacillus* genetic stock center, Nov 2001), (1.77) *Paenibacillus macerans*, (1.78) *Paenibacillus polymyxa*, in particular strain AC-1 (product known as Topseed from Green Biotech Company Ltd.), (1.79) *Paenibacillus popilliae* (formerly *Bacillus popilliae*) product known as Milky spore disease from St. Gabriel Laboratories), (1.80) *Pantoea agglomerans*, in particular strain E325 (Accession No. NRRL B-21856), (product known as Bloomtime Biological FD Biopesticide from Northwest Agricultural Products), (1.81) *Pasteuria nishizawae* (product known as oyacyst LF/ST from Pasteuria Bioscience), (1.82) *Pasteuria penetrans* (formerly *Bacillus penetrans*), (product known as *Pasteuria* wettable powder from Pasteuria Bioscience), (1.83) *Pasteuria ramosa*, (1.84) *Pasteuria reniformis*, (1.85) *Pasteuria thornei*, (1.86) *Pasteuria usgae* (products known as Econem™ from Pasteuria Bioscience), (1.87) *Pectobacterium carotovorum* (formerly *Erwinia carotovora*), (product known as BioKeeper from Nissan, JP), (1.88) *Pseudomonas aeruginosa*, in particular strains WS-1 or PN1, (1.89) *Pseudomonas aureofaciens*, in particular strain TX-1 (product known as Spot-Less Biofungicide from Eco Soils Systems, CA), (1.90) *Pseudomonas cepacia* (formerly known as *Burkholderia cepacia*), in particular type Wisconsin, strains M54 or J82, (1.91) *Pseudomonas chlororaphis*, in particular strain MA 342 (products known as Cedomon from Bioagri, S), or strain 63-28 (product known as ATEze from EcoSoil Systems, US), (1.92) *Pseudomonas fluorescens*, in particular strain A506 (products known as Blightban from NuFarm or Frostban B from Frost Technology Corp), or strain 1629RS (product known as Frostban D from Frost Technology Corp), (1.93) *Pseudomonas proradix* (product known as Proradix® from Sourcon Padena), (1.94) *Pseudomonas putida*, (1.95) *Pseudomonas resinovorans* (product known as Solanacure from Agricultural Research Council, SA), (1.96) *Pseudomonas syringae*, in particular strain MA-4 (product known as Biosave from EcoScience, US), or strain 742RS (product known as Frostban C from Frost Technology Corp, (1.97) *Rhizobium fredii*, (1.98) *Rhizobium leguminosarum*, in particular bv. viceae strain Z25 (Accession No. CECT 4585), (1.99) *Rhizobium loti*, (1.100) *Rhizobium meliloti*, (1.101) *Rhizobium trifolii*, (1.102) *Rhizobium tropici*, (1.103) *Rhodococcus globerulus* strain AQ719 (Accession No. NRRL B21663) from Bayer Crop Science, DE, (1.104) *Serratia entomophila* (product known as Invade® from Wrightson Seeds), (1.105) *Serratia marcescens*, in particular strain SRM (Accession No. MTCC 8708) or strain $R^{35}$, (1.106) *Streptomyces* sp. strain NRRL B-30145 from Bayer Crop Science, DE, or strains WYE 20 (KCTC 0341BP) and WYE 324 (KCTC0342BP), (1.107) *Streptomyces acidiscabies*, in particular strain RL-110T, (product known as MBI-005EP from Marrone Bioinnovations, CA), (1.108) *Streptomyces candidus*, in particular strain Y21007-2, (products known as BioBac or BioAid from Biontech, TW), (1.109) *Streptomyces colombiensis* (1.110) *Streptomyces galbus* (=*Streptomyces griseoviridis*), in particular strain K61 (Accession No. DSM 7206) (product known as Mycostop® from Verdera, cf. Crop Protection 2006, 25, 468-475) or strain QST 6047 (=strain NRRL B-30232) (product known as Virtuoso from Bayer Crop Science, DE), (1.111) *Streptomyces goshikiensis*, (1.112) *Streptomyces lavendulae*, (1.113) *Streptomyces lydicus*, in particular strain WYCD108US) or strain WYEC108 (product known as Actinovate from Natural Industries, US), (1.114) *Streptomyces microflavus*, in particular strain AQ6121 (=QRD 31.013, NRRL B-50550) from Bayer Crop Science, or strain M (=AQ6121.002) (091013-02 deposited with the Canadian International Depository Authority) from Bayer Crop Science, (1.115) *Streptomyces prasinus* (cf. "Prasinons A and B: potent insecticides from *Streptomyces prasinus*", Applied microbiology 1973 Nov), (1.116) *Streptomyces rimosus*, (1.117) *Streptomyces saraceticus* (product known as Clanda from A & A Group (Agro Chemical Corp.)), (1.118) *Streptomyces venezuelae*, (1.119) *Thiobacillus* sp. (product known as Cropaid from Cropaid Ltd UK), (1.120) Virgibacillus *pantothenticus* (formerly *Bacillus pantothenticus*), in particular strain ATCC 14576/DSM 491, (1.121) *Xanthomonas campestris* (herbicidal activity), in particular pv *poae* (product known as Camperico), (1.122) *Xenorhabdus* (=*Photorhabdus*)

*luminescens*, and (1.123) *Xenorhabdus* (=*Photorhabdus*) *nematophila*, wherein said mentioned bacteria are preferred.

(2) According to the invention biological control agents that are summarized under the term "fungi" or "yeasts" include but are not limited to:

(2.1) *Ampelomyces quisqualis*, in particular strain AQ 10 (Accession No. CNCM I-807) (product known as AQ 10® from IntrachemBio Italia), (2.2) Arkansas Fungus 18 (ARF18, cf. WO2012/140207), (2.3) *Arthrobotrys dactyloides* (cf. WO 2012/140207), (2.4) *Arthrobotrys oligospora* (cf. WO 2012/140207), (2.5) *Arthrobotrys superba*, (cf. WO 2012/140207), (2.6) *Aschersonia aleyrodis* (cf. Berger, 1921. Bull. State Pl. Bd. 5:141), (2.7) *Aspergillus flavus*, in particular strain NRRL 21882 (product known as Afla-Guard® from Syngenta) or strain AF36 (product known as AF36 from Arizona Cotton Research and Protection Council, US), (2.8) *Aureobasidium pullulans*, in particular blastospores of strain DSM14940 or blastospores of strain DSM 14941 or mixtures thereof (products known as Botector® or Blossom Protect® from bio-ferm, CH), (2.9) *Beauveria bassiana*, in particular strain ATCC 74040 (product known as Naturalis® from Intrachem Bio Italia) and strain GHA (Accession No. ATCC74250) (products known as BotaniGuard Es or Mycontrol-O from Laverlam International Corporation), or strain ATP02 (Accession No. DSM 24665, cf. WO/2011/117351), or strain CG 716 (product known as BoveMax® from Novozymes), or strain ANT-03 (from Anatis Bioprotection, CA), (2.10) *Beauveria brongniartii* (product known as Beaupro from Andermatt Biocontrol AG), (2.11) *Candida oleophila*, in particular strain 0 (product known as Nexy® from BioNext) or isolate I-182 (product known as Aspire® from Ecogen, US), (2.12) *Candida saitoana*, in particular strain NRRL Y-21022 (cf. Patent U.S. Pat. No. 5,591,429), (2.13) *Chaetomium cupreum*, (2.14) *Chaetomium globosum*, (2.15) *Cladosporium cladosporioides*, in particular strain H39, (2.16) *Colletotrichum gloeosporioides*, in particular strain ATCC 20358, (2.17) *Conidiobolus obscurus*, (2.18) *Coniothyrium minitans*, in particular strain CON/M/91-8 (Accession No. DSM-9660), (product known as Contans® from Bayer Crop Science, DE), (2.19) *Cryptococcus albidus* (product known as YieldPlus® from Anchor Bio-Technologies, ZA), (2.20) *Cryptococcus flavescens*, in particular strain 3C (NRRL Y-50378) and strain 4C (NRRL Y-50379) (described in U.S. Pat. No. 8,241,889), (2.21) *Cylindrocarpon heteronema*, (2.22) *Dactylaria candida*, (2.23) *Dilophosphora alopecuri* (product known as Twist Fungus®), (2.24) *Entomophthora virulenta* (product known as Vektor), (2.25) *Exophiala jeanselmei*, (2.26) *Exophilia pisciphila*, (2.27) *Fusarium oxysporum*, in particular strain Fo47 (non-pathogenic) (product known as Fusaclean from Natural Plant Protection, FR), (2.28) *Fusarium solani*, for example strain Fs5 (non-pathogenic), (2.29) *Gigaspora margarita*, (2.30) *Gigaspora monosporum*, (2.31) *Gliocladium catenulatum* (Synonym: *Clonostachys rosea f. catenulate*) in particular strain J1446 (products known as Prestop® from AgBio Inc. or Primastop® from Kemira Agro Oy), (2.32) *Gliocladium roseum*, in particular strain 321U, (2.33) *Glomus aggregatum*, (2.34) *Glomus brasilianum*, (2.35) *Glomus clarum*, (2.36) *Glomus deserticola*, (2.37) *Glomus etunicatum*, (2.38) *Glomus intraradices*, (2.39) *Glomus iranicum*, (2.40) *Glomus monosporum*, (2.41) *Glomus mosseae*, (2.42) *Harposporium anguillullae*, (2.43) *Hirsutella citriformis*, (2.44) *Hirsutella minnesotensis*, (2.45) *Hirsutella rhossiliensis*, (2.46) *Hirsutella thompsonii* (products known as Mycohit or ABTEC from Agro Bio-tech Research Centre, IN), (2.47) *Laccaria bicolor*, (2.48) *Laccaria laccata*, (2.49) *Lagenidium giganteum* (product known as Laginex®, Bayer Crop Science, DE), (2.50) *Lecanicillium* spp., in particular strain HRO LEC 12 from Bayer Crop Science, DE, (2.51) *Lecanicillium lecanii* (formerly known as *Verticillium lecanii*) in particular conidia of strain KVO1 (products known as Mycotal® or Vertalec®, Koppert/Arysta), or strain DAOM198499, or strain DAOM216596, (2.52) *Lecanicillium muscarium* (formerly *Verticillium lecanii*), in particular strain 1/1 from Bayer Crop Science, DE, or strain VE 6/CABI (=IMI) 268317/CBS102071/ARSEF5128, (2.53) *Meristacrum asterospermum* (2.54) *Metarhizium anisopliae*, in particular strain F52 (DSM3884/ATCC 90448) (products known as BIO 1020, Bayer Crop Science, DE, or Met52, Novozymes), or *M. anisopliae* var *acridum* (product known as GreenGuard, Becker Underwood, US), or *M. anisopliae* var *acridum* isolate IMI 330189 (ARSEF7486), (product known as Green Muscle from Biological Control Products), (2.55) *Metarhizium flavoviride*, (2.56) *Metschnikowia fructicola*, in particular the strain NRRL Y-30752 (product known as Shemer® from Bayer Crop Science, DE), (2.57) *Microdochium dimerum*, in particular strain L13 (products known as ANTIBOT® from Agrauxine), (2.58) *Microsphaeropsis ochracea* (product known as Microx® from Bayer Crop Science, DE), (2.59) *Monacrosporium cionopagum*, (2.60) *Monacrosporium psychrophilum*, (2.61) *Monacrosporium drechsleri*, (2.62) *Monacrosporium gephyropagum* (2.63) *Mucor haemelis* (product known as BioAvard from Indore Biotech Inputs & Research), (2.64) *Muscodor albus*, in particular strain QST 20799 (Accession No. NRRL 30547) (products known as Arabesque™, Glissade™, or Andante™ from Bayer Crop Science, DE), (2.65) *Muscodor roseus* strains A3-5 (Accession No. NRRL 30548), (2.66) *Myrothecium verrucaria*, in particular strain AARC-0255 (product known as DiTera™ from Valent Biosciences), (2.67) *Nematoctonus geogenius*, (2.68) *Nematoctonus leiosporus*, (2.69) *Neocosmospora vasinfecta*, (2.70) *Nomuraea rileyi*, in particular strains SA86101, GU87401, SR86151, CG128 and VA9101, (2.71) *Ophiostoma piliferum*, in particular strain D97 (product known as Sylvanex), (2.72) *Paecilomyces fumosoroseus* (new: *Isaria fumosorosea*), in particular strain IFPC 200613, or strain apopka 97 (product known as PreFeRal® WG from Biobest) or strain FE 9901 (products known as NoFly® from Natural Industries Inc., US), (2.73) *Paecilomyces lilacinus*, in particular spores of *P. lilacinus* strain 251 (AGAL 89/030550), (product known as BioAct® from Bayer Crop Science, DE; cf. Crop Protection 2008, 27, 352-361), (2.74) *Paecilomyces variotii*, in particular strain Q-09 (product known as Nemaquim® from Quimia, MX), (2.75) *Pandora delphacis*, (2.76) *Paraglomus* sp, in particular *P. brasilianum*, (2.77) *Penicillium bilaii*, in particular strain ATCC 22348 (products known as JumpStart® from Novozymes, PB-50, Provide), (2.78) *Penicillium vermiculatum*, (2.79) *Phlebiopsis* (or *Phlebia* or *Peniophora*) *gigantea*, in particular the strains VRA 1835 (ATCC 90304), VRA 1984 (DSM16201), VRA 1985 (DSM16202), VRA 1986

(DSM16203), FOC PG B20/5 (IMI390096), FOC PG SP log 6 (IMI390097), FOC PG SP log 5 (IMI390098), FOC PG BU3 (IMI390099), FOC PG BU4 (IMI390100), FOC PG 410.3 (IMI390101), FOC PG 97/1062/116/1.1 (IMI390102), FOC PG B22/SP1287/3.1 (IMI390103), FOC PG SH1 (IMI390104), FOC PG B22/SP1190/3.2 (IMI390105), (products known as Rotstop® from Verdera, FIN, PG-Agromaster®, PG-Fungler®, PG-IBL®, PG-Poszwald®, Rotex® from e-nema, DE), (2.80) *Phoma macrostroma*, in particular strain 94-44B (products known as *Phoma* H or *Phoma* P from Scotts, US), (2.81) *Pichia anomala*, in particular strain WRL-076 (NRRL Y-30842), (2.82) *Pisolithus tinctorius*, (2.83) *Pochonia chlamydosporia* (also known as *Vercillium chlamydosporium*), in particular var *catenulata* (IMI SD 187) (product known as KlamiC from The National Center of Animal and Plant Health (CENSA), CU), or *P. chlamydosporia* var *chlamydosporia* (resp. *V. chlamydosporium* var *chlamydosporium*), (2.84) *Pseudozyma aphidis* (2.85), *Pseudozyma flocculosa*, in particular strain PF-A22 UL (product known as Sporodex® L from Plant Products Co., CA), (2.86) *Pythium oligandrum*, in particular strain DV74 or M1 (ATCC 38472), (product known as Polyversum from Biopreparty, CZ), (2.87) *Rhizopogon amylopogon*, (2.88) *Rhizopogon fulvigleba*, (2.89) *Rhizopogon luteolus*, (2.90) *Rhizopogon tinctorus*, (2.91) *Rhizopogon villosullus*, (2.92) *Saccharomyces cerevisae*, in particular strain CNCM No. I-3936, strain CNCM No. I-3937, strain CNCM No. I-3938, strain CNCM No. I-3939 (patent application US 2011/0301030), (2.93) *Scleroderma citrinum*, (2.94) *Sclerotinia minor*, in particular strain IMI 344141 (product known as Sarritor), (2.95) *Sporothrix insectorum* (product known as *Sporothrix* Es from Biocerto, BR), (2.96) *Stagonospora atriplicis*, (2.97) *Stagonospora heteroderae*, (2.98) *Stagonospora phaseoli*, (2.99) *Suillus granulatus*, (2.100) *Suillus punctatapies*, (2.101) *Talaromyces flavus*, in particular strain V117b (product known as PROTUS® WG from Bayer Crop Science, DE), (2.102) *Trichoderma album* (product known as Bio Zeid® from Organic Biotechnology, EG), (2.103) *Trichoderma asperellum*, in particular strain ICC 012 (CABI CC IMI 392716) (also known as *Trichoderma harzianum* ICC012), or strain SKT-1 (product known as ECO-HOPE® from Kumiai Chemical Industry) or strain T34 (product known as T34 Biocontrol from Bioncontrol Technologies, ES) or isolate SF04 (URM-5911) or strain TV1 (MUCL 43093) (also known as *Trichoderma viride* TV1) or strain T11 (CECT 20178) (also known as *Trichoderma viride* T25), (2.104) *Trichoderma atroviride*, in particular strain CNCM I-1237 (product known as Esquive® WP from Agrauxine, FR,) or the strains NMI No. V08/002387, NMI No. V08/002388, NMI No. V08/002389, NMI No. V08/002390 (patent application US 2011/0009260) or strain ATCC 20476 (IMI 206040) or strain T11 (IMI352941/CECT20498) or strain LC52 (products known as Tenet® or Sentinel® from Agrimm Technologies, NZ), or strain SC1 from Bayer Crop Science, DE, or the strains SKT-1 (FERM P-16510), SKT-2 (FERM P-16511) and SKT-3 (FERM P-17021), (2.105) *Trichoderma gamsii* (formerly *T. viride*), in particular strain ICCO80 (IMI CC 392151 CABI) (product known as Bioderma), (2.106) *Trichoderma harmatum*, in particular strain TH382 (product known as Incept from Syngenta), (2.107) *Trichoderma harzianum*, in particular *T. harzianum rifai* T39 (product known as Trichodex® from Makhteshim, US), or *T. harzianum* rifai strain KRL-AG2 (strain T-22,/ATCC 208479) (products known as PLANTSHIELD T-22G, Rootshield® and TurfShield from BioWorks, US), or strain KD (products known as Trichoplus from Biological Control Products, SA, or Eco-T from Plant Health Products, SZ), or strain ITEM 908 (CBS 118749), or strain TH 35 (formerly known as *Trichoderma lignorum*), (product known as Root Pro from Mycontrol), or strain DB 103 (product known as T-Gro from Dagutat Biolab), or strain TSTh20 (Patent Deposit Designation number PTA-0317), or strain 1295-22, (2.108) *Trichoderma koningii*, (2.109) *Trichoderma lignorum*, in particular strain TL-0601 (product known as Mycotric from Futureco Bioscience, ES), (2.110) *Trichoderma polysporum*, in particular strain IMI 206039/ATCC 20475, (2.111) *Trichoderma saturnisporium*, in particular strain PBP-TH-001 from Bayer Crop Science, DE, (2.112) *Trichoderma stromaticum* (product known as TRICOVAB® from Ceclap, BR), (2.113) *Trichoderma virens* (also known as *Gliocladium virens*), in particular strain GL-21 (product known as SoilGard from Certis, US) or strain G41, (2.114) *Trichoderma viride*, in particular strain TV1, (2.115) *Tsukamurella paurometabola*, in particular strain C-924 (product known as HeberNem®), (2.116) *Ulocladium oudemansii*, in particular strain HRU3 (product known as Botry-Zen® from Botry-Zen Ltd, NZ), (2.117) *Verticillium alboatrum* (formerly *V. dahliae*), in particular strain WCS850 (CBS 276.92), (2.118) *Verticillium chlamydosporium*, (2.119) *Verticillium dahlia* and (2.120) *Zoophtora radicans*, wherein said mentioned fungi or yeasts are preferred.

(3) According to the invention biological control agents that are summarized under the term "protozoa" include but are not limited to:

(3.1) *Nosema locustae* (product known as NoloBait), (3.2) *Thelohania solenopsis* and (3.3) *Vairimorpha* spp, wherein said mentioned protozoa are preferred.

(4) According to the invention biological control agents that are summarized under the term "viruses" include but are not limited to:

(4.1) *Adoxophyes orana* (summer fruit *tortrix*) granulosis virus (GV), (product known as Capex® from BIOFA), (4.2) *Agrotis segetum* (turnip moth) nuclear polyhedrosis virus (NPV), (4.3) *Anagrapha falcifera* (celery looper) NPV, (4.4) *Anticarsia gemmatalis* (woolly pyrol moth) multiple NPV (product known as Coopervirus PM by Coodetec), (4.5) *Autographa californica* (alfalfa looper) mNPV (product known as VPN80 from Agricola El Sol; GT), (4.6) *Biston suppressaria* (tea looper) NPV, (4.7) *Bombyx mori* (silkworm) NPV, (4.8) *Cryptophlebia leucotreta* (false codling moth) GV (products known as Cryptex from Andermatt Biocontrol, CH), (4.9) *Cydia pomonella* (codling moth) granulosis virus (GV) (product known as Madex Plus from Andermatt Biocontrol, CH), (4.10) *Dendrolimus punctatus* (masson pine moth) CPV, (4.11) *Helicoverpa armigera* (cotton bollworm) NPV (product known as Helicovex from Andermatt Biocontrol, CH), (4.12) *Helicoverpa* (previously *Heliothis*) *zea* (corn earworm) NPV (product known as Elcar), (4.13) *Leucoma salicis* (satin moth) NPV, (4.14) *Lymantria dispar* (gypsy moth) NPV (product known as Gypcheck, US Forest Service), (4.15) *Neodiprion abietis* (balsam-fir sawfly) NPV (product known as Abietiv™), (4.16) *Neodiprion*

*lecontei* (red-headed pine sawfly) NPV (product known as Lecontvirus from the Canadian Forestry Service), (4.17) *Neodiprion sertifer* (pine sawfly) NPV (product known as Neocheck-S from the US Forest service), (4.18) *Orgyia pseudotsugata* (douglas-fir tussock moth) NPV (product known as TM-BioControl-1™), (4.19) *Phthorimaea operculella* (tobacco leaf miner) GV (product known as Matapol Plus), (4.20) *Pieris rapae* (small white butterfly) GV, (4.21) *Plutella xylostella* (diamondback moth) GV, (4.22) *Spodoptera albula* (gray-streaked armyworm moth) mNPV (product known as VPN 82, Agricola El Sol, GT), (4.23) *Spodoptera exempta* (true armyworm) mNPV, (4.24) *Spodoptera exigua* (sugarbeet armyworm) mNPV (product known as Spexit from Andermatt Biocontrol), (4.25) *Spodoptera frugiperda* (fall armyworm) mNPV), (4.26) *Spodoptera littoralis* (tobacco cutworm) NPV (products known as Littovir from Andermatt Biocontrol, CH or Spodoptrin from NPP Calliope France), and (4.27) *Spodoptera litura* (oriental leafworm moth) NPV (products known as Littovir), wherein said mentioned viruses are preferred.

(5) According to the invention biological control agents that are summarized under the term "entomopathogenic nematodes" include but are not limited to:

(5.1) *Abbreviata caucasica*, (5.2) *Acuaria* spp., (5.3) *Agamermis decaudata*, (5.4) *Allantonema* spp., (5.5) *Amphimermis* spp., (5.6) *Beddingia* (=Deladenus) *siridicola*, (5.7) *Bovienema* spp., (5.8) *Cameronia* spp., (5.9) *Chitwoodiella ovofilamenta*, (5.10) *Contortylenchus* spp., (5.11) *Culicimermis* spp., (5.12) *Diplotriaena* spp., (5.13) *Empidomermis* spp., (5.14) *Filipjevimermis leipsandra*, (5.15) *Gastromermis* spp., (5.16) *Gongylonema* spp., (5.17) *Gynopoecilia pseudovipara*, (5.18) *Heterorhabditis* spp., in particular (5.19) *Heterorhabditis bacteriophora* (products known as B-Green® or Larvanem®, Koppert or Nemasys® G, Becker Underwood), or (5.20) *Heterorhabditis baujardi*, or (5.21) *Heterorhabditis heliothidis* (products known as Nematon®, biohelp GmbH), or (5.22) *Heterorhabditis indica*, (5.23) *Heterorhabditis marelatus*, (5.24) *Heterorhabditis megidis* (products known as Larvanem® M, Koppert or Meginem®, Andermatt Biocontrol AG or Nemasys-H®), (5.25) *Heterorhabditis zealandica*, (5.26) *Hexamermis* spp., (5.27) *Hydromermis* spp., (5.28) *Isomermis* spp., (5.29) *Limnomermis* spp., (5.30) *Maupasina weissi*, (5.31) *Mermis nigrescens*, (5.32) *Mesomermis* spp., (5.33) *Neomesomermis* spp., (5.34) *Neoparasitylenchus rugulosi*, (5.35) *Octomyomermis* spp., (5.36) *Parasitaphelenchus* spp., (5.37) *Parasitorhabditis* spp., (5.38) *Parasitylenchus* spp., (5.39) *Perutilimermis culicis*, (5.40) *Phasmarhabditis hermaphrodita* (product known as Nemaslug from BASF AG), (5.41) *Physaloptera* spp., (5.42) *Protrellatus* spp., (5.43) *Pterygodermatites* spp., (5.44) *Romanomermis* spp., (5.45) *Seuratum cadarachense*, (5.46) *Sphaerulariopsis* spp., (5.47) *Spirura guianensis*, (5.48) *Steinernema* spp. (=*Neoaplectana* spp.), in particular (5.49) *Steinernema bibionis* (product known as Nematoden gegen Trauermücken®), or (5.50) *Steinernema carpocapsae* (products known as Biocontrol, Nemasys-C®, NemAttack®), or (5.51) *Steinernema feltiae* (=*Neoaplectana carpocapsae*), (products known as Nemasys®, Nemaflor®, Nemaplus®, NemaShield®), or (5.52) *Steinernema glaseri* (products known as Biotopia®), or (5.53) *Steinernema kraussei* (products known as Exhibitline®, Grubsure®, Kraussei System®, Larvesure®), or (5.54) *Steinernema riobrave* (products known as Biovector®), or (5.55) *Steinernema scapterisci* (products known as Nematac® S), or (5.56) *Steinernema scarabaei*, or (5.57) *Steinernema siamkayai*, (5.58) *Steinernema thailandse* (products known as Nemanox®), (5.59) *Strelkovimermis peterseni*, (5.60) *Subulura* spp., (5.61) *Sulphuretylenchus elongatus*, and (5.62) *Tetrameres* spp., wherein said mentioned entomopathogenic nematodes are preferred.

(6) Biological control agents which are summarized under the term "proteins or secondary metabolites" include but are not limited to:

(6.1) *Bacillus thuringiensis* toxins (isolated from different subspecies of *B. thuringiensis*), (6.2) Gougerotin (isolated from *Streptomyces microflavus* strain AQ 6121, from Bayer Crop Science), (6.3) Harpin (isolated from *Erwinia amylovora*, e.g. products known as Harp-N-Tek™, Messenger®, Employ™, N-Hibit™, ProAct™), (6.4) the spider toxin GS-omega/kappa-Hxtx-Hv1a, product known as Versitude from Vestaron, wherein said mentioned proteins or secondary metabolites are preferred.

(7) Biological control agents which are summarized under the term "botanical extracts" include but are not limited to:

(7.1) Thymol, extracted e.g. from thyme (*Thymus vulgaris*), (7.2) Neem tree (*Azadirachta indica*) oil, and therein Azadirachtin, (7.3) Pyrethrum, an extract made from the dried flower heads of different species of the genus *Tanacetum*, and therein Pyrethrins (the active components of the extract), (7.4) extract of *Cassia nigricans*, (7.5) wood extract of *Quassia amara* (bitterwood), (product known as Quassan from Andermatt Biocontrol AG), (7.6) Rotenon, an extract from the roots and stems of several tropical and subtropical plant species, especially those belonging to the genera *Lonchocarpus* and *Derris*, (7.7) extract of *Allium sativum* (garlic), (7.8) *Quillaja* extract, made from the concentrated purified extract of the outer cambium layer of the *Quillaja Saponaria Molina* tree, (7.9) *Sabadilla* (*Sabadilla=Schoenocaulon officinale*) seeds, in particular Veratrin (extracted from the seeds), (7.10) *Ryania*, an extract made from the ground stems of *Ryania speciosa*, in particular Ryanodine (the active component of the extract), (7.11) extract of *Viscum album* (mistletoe), (7.12) extract of *Tanacetum vulgare* (tansy), (7.13) extract of *Artemisia absinthium* (wormwood), (7.14) extract of *Urtica dioica* (stinging nettle), (7.15) extract of *Symphytum officinale* (common comfrey), (7.16) extract of *Tropaeulum majus* (monks cress), (7.17) leaves and bark of *Quercus* (oak tree) (7.18) Yellow mustard powder, (7.19) oil of the seeds of *Chenopodium anthelminticum* (wormseed goosefoot), (7.20) dried leaves of *Dryopteris filix-mas* (male fern), (7.21) bark of *Celastrus angulatus* (chinese bittersweet), (7.22) extract of *Equisetum arvense* (field horsetail), (7.23) Chitin (7.24) natural extracts or simulated blend of *Chenopodium ambrosioides* (wormseed), (product known as Requiem® from Bayer Crop Science) which contains a mixture of three terpenes, i.e. α-terpinene (around 10%), p-cymene (around 3.75%) and limonene (around 3%) as pesticidally active ingredients; it is disclosed in US 2010/0316738 corresponding to WO 2010/144919), (7.25) Saponins of *Chenopodium quinoa* (quinoa goosefoot), (product known as Heads Up), (7.26) Maltodextrin (product known as Majestik from Certis Europe), (7.27) orange oil (product known as PREV-AM from Oro Agri B.V.), sesame oil (product known as Dragon-fire-CCP, U.S. Pat. No. 6,599,539), wherein said mentioned botanical extracts are preferred.

All mixing partners of group II can, if their functional groups enable this, optionally form salts with suitable bases or acids. All mixing partners of group II can include tautomeric forms, where applicable.

The active compounds of group II which are specified herein by their "common name" are known and described inter alia in "The Pesticide Manual", 16th edition, The British Crop Protection Council and the Royal Soc. of Chemistry, 2012 and the literature cited therein or can be searched in the internet (e.g. http://www.alanwood.net/pesticides). Particularly, reference shall be made to said Manual or website in order to further specify such a mixing partner of group II, e.g. to provide its chemical structure (where applicable), IUPAC name or its pesticidal activity. Further information about such a mixing partner of group II will be provided as well, in particular it's composition in case that the mixing partner of group II is itself a mixture, e.g. a mixture of enantiomers.

If, e.g. within this description, the common name of an active compound is used, this in each case encompasses all common derivatives, such as the esters and salts, and isomers, especially optical isomers, especially the commercial form or forms. If an ester or salt is referred to by the common name, this also refers in each case to all other common derivatives, such as other esters and salts, the free acids and neutral compounds, and isomers, especially optical isomers, especially the commercial form or forms. The chemical compound names mentioned refer to at least one of the compounds encompassed by the common name, frequently a preferred compound.

Preferred are active compound combinations comprising compounds of the formula (I), in which the radicals are defined as below:

W preferably represents methyl,
X preferably represents chlorine or methyl, (particularly preferably methyl),
Y preferably represents chlorine, bromine or methyl,
D preferably represents hydrogen.

A, B and the carbon atom to which they are attached preferably represent saturated $C_6$-cycloalkyl which is substituted by a alkylenedioxyl group which, together with the carbon atom to which it is attached, forms a five-membered or six-membered ketal, G preferably represents hydrogen or represents one of the groups

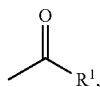   (b)

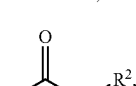   (c)

E   (d)

in which
M represents oxygen,
E represents a metal ion or an ammonium ion, (preferably sodium or potassium)
$R^1$ represents straight-chain or branched $C_1$-$C_4$-alkyl,
$R^2$ represents straight-chain or branched $C_1$-$C_4$-alkyl.

Particularly preferred are compounds of the formula (I) in which G represents hydrogen.

Very particularly preferred are active compound combinations comprising compounds of the formula (I), in which the radicals are defined as below:

(I)

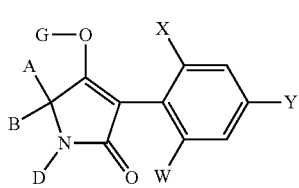

| Ex.- No. | W | X | Y | A | B | G | D | Known from WO 06/089633; Ex. No. |
|---|---|---|---|---|---|---|---|---|
| I-1 | CH$_3$ | CH$_3$ | CH$_3$ | —(CH$_2$)$_2$—C—(CH$_2$)$_2$— O—(CH$_2$)$_2$—O | | H | H | I-1-a-2 |
| I-2 | CH$_3$ | CH$_3$ | Cl | —(CH$_2$)$_2$—C—(CH$_2$)$_2$— O—(CH$_2$)$_2$—O | | H | H | I-1-a-4 |
| I-3 | CH$_3$ | CH$_3$ | Br | —(CH$_2$)$_2$—C—(CH$_2$)$_2$— O—(CH$_2$)$_2$—O | | H | H | I-1-a-26 |
| I-4 | CH$_3$ | CH$_3$ | CH$_3$ | —(CH$_2$)$_2$—C—(CH$_2$)$_2$— O—(CH$_2$)$_3$—O | | H | H | I-1-a-18 |

-continued

| Ex.- No. | W | X | Y | A | B | G | D | Known from WO 06/089633; Ex. No. |
|---|---|---|---|---|---|---|---|---|
| I-5 | CH$_3$ | CH$_3$ | Cl | —(CH$_2$)$_2$—C—(CH$_2$)$_2$— <br> O—(CH$_2$)$_3$—O | | H | H | I-1-a-14 |
| I-6 | CH$_3$ | CH$_3$ | Br | —(CH$_2$)$_2$—C—(CH$_2$)$_2$— <br> O—(CH$_2$)$_3$—O | | H | H | I-1-a-19 |

Especially preferred are active compound combinations comprising a compound of the formula (I-2) and Requiem.

Especially preferred are active compound combinations comprising a compound of the formula (I-2) and limonene.

Depending inter alia on the nature of the substituents, the compounds of the formula (I) can be present as optical isomers or isomer mixtures of varying composition which, if appropriate, may be separated in a customary manner. The present invention provides both the pure isomers and the isomer mixtures, their preparation and use, and compositions comprising them. However, for the sake of simplicity, hereinbelow only compounds of the formula (I) are referred to, although what is meant are both the pure compounds and, if appropriate, also mixtures having varying proportions of isomeric compounds.

Methods and Uses

The invention also relates to methods for controlling animal or microbial pests, in which active compound combinations according to the invention are allowed to act on the animal or microbial pests and/or their habitat. Preferably, the animal pest is an insect or arachnid or acarid pest. Such control of the animal or microbial pests is preferably conducted in agriculture and forestry, and in material protection. Preferably excluded herefrom are methods for the surgical or therapeutic treatment of the human or animal body and diagnostic methods carried out on the human or animal body.

The invention also relates to the use of active compound combinations according to the invention as pesticidal combinations, in particular crop protection agents. In the context of the present application, the term "pesticide" in each case also always comprises the term "crop protection agent".

The active compound combinations according to the invention are preferably suitable for controlling animal and microbial pests.

The active compound combinations according to the invention are particularly preferably suitable for controlling animal pests, especially insect or arachnid or acarid pests.

The active compound combinations according to the invention are particularly preferably suitable for controlling microbial pests.

The active compound combinations according to the invention are particularly preferably suitable for controlling nematodes.

Preferably excluded from such uses are uses for the surgical or therapeutic treatment of the human or animal body and diagnostic methods carried out on the human or animal body.

The active compound combinations according to the invention are particularly preferably used as plant-strengthening agents.

If appropriate, the active compound combinations according to the invention can, at certain concentrations or application rates, also be used as herbicides, safeners, growth regulators or agents to improve plant properties, or as microbicides, for example as fungicides, antimycotics, bactericides, viricides (including agents against viroids) or as agents against MLO (*Mycoplasma*-like organisms) and RLO (*Rickettsia*-like organisms). If appropriate, they can also be employed as intermediates or precursors for the synthesis of other active compound compositions.

The invention also relates to a process for preparing a crop protection agent, characterized in that an active compound combination according to the invention is mixed with extenders and/or surfactants.

The invention also relates to the use of an active compound combination according to the invention for treating plants or parts thereof selected from the group consisting of citrus, pome fruits, stone fruits, tropical fruits, nuts, berries, vegetables, cotton, soybean, grape, tea, coffee, maize, rice and ornamentals.

The person skilled in the art is aware that the terms "a" or "an", as used in the present application, may, depending on the situation, mean "one (1)" "one (1) or more" or "at least one (1)". Generally, the term refers to the meaning of "one (1) or more" or "at least one (1)". However, in one embodiment, the term "a" refers exclusively to "one (1)".

In the context of the present invention, "control of pests" means a reduction in infestation by harmful pests, compared with the untreated plant measured as pesticidal efficacy, preferably a reduction by 25-50%, compared with the untreated plant (100%), more preferably a reduction by 40-79%, compared with the untreated plant (100%); even more preferably, the infection by pests is entirely suppressed (by 70-100%). The control may be curative, i.e. for treatment of already infected plants, or protective, for protection of plants which have not yet been infected.

In the context of the present invention, "control of microbial pests" means a reduction in infestation by harmful microorganisms, compared with the untreated plant measured as fungicidal efficacy, preferably a reduction by 25-50%, compared with the untreated plant (100%), more preferably a reduction by 40-79%, compared with the untreated plant (100%); even more preferably, the infection by harmful microorganisms is entirely suppressed (by 70-100%). The control may be curative, i.e. for treatment of already infected plants, or protective, for protection of plants which have not yet been infected.

Mites are arthropods belonging to the subclass *Acari* (also known as *Acarina*) of the class Arachnida. Bananas and plantains belong to the genera *Musa* in the family Musaceae.

Citrus is a common term and genus (Citrus) of flowering plants in the rue family, *Rutaceae*. The term Citrus includes orange (*C. sinensis*), lemon (*C. limon*), grapefruit (*C. paradisi*), and lime (various, mostly *C. aurantifolia*, the key lime).

Pome is a common term for fruits produced by flowering plants in the subtribe Malinae of the family Rosaceae and for plants producing these fruits. A pome is an accessory fruit composed of one or more carpels surrounded by accessory tissue. Examples of plants that produce fruit classified as a pome are apple, loquat, pear, *Pyracantha*, and quince.

Vegetable as used herein refers to an edible plant or its part selected from the list consisting of flower bud vegetable such as broccoli, cauliflower, globe artichokes and capers; leaf vegetable such as kale, spinach (*Spinacia oleracea*), arugula (*Eruca sativa*), and lettuce (*Lactuca sativa*); stem vegetable such as kohlrabi; stem shoot vegetable such as asparagus, bamboo shoots, potatoes (*Solanum tuberosum* L) and sweet potatoes (*Ipomoea batatas*); root vegetable such as carrots (*Daucus carota*), parsnips (*Pastinaca sativa*), beets (*Beta vulgaris*), and radishes (*Raphanus sativus*); bulb vegetable such as onion, garlic and shallots of genus *Allium*; tomato (*Solanum lycopersicum*), cucumber (*Cucumis sativus*), zucchini, squash and pumpkin of genus species *Cucurbita pepo*, pepper (of family Solanaceae), eggplant; beans (*Phaseolus vulgaris*). and pea (*Pisum sativum*).

Stone fruit are all species of the *Prunus* genus. Examples of plants that produce fruit classified as a stone fruit are e.g. peaches, nectarines, plums, apricots, and cherries. Subtropical and tropical fruit are fruit produced by plants native to the geographical and climatic region of the subtropics or tropics. Examples of plants that produce fruit classified as a subtropical or tropical fruit are e.g avocado, banana, cherimoya, date, dragon fruit, durian, fig, guava, jackfruit, kiwi, lychee, mango, mangosteen, passion fruit, papaya, pineapple, persimmon, pomegranate, rambutan and star fruit. Nuts are referring to any hard-walled, edible kernel such as e.g. almonds, Brazil nuts, cashews, hazelnuts, macadamias, peanuts, pecans, pine nuts, pistachios and walnuts.

Berries are any small edible fruit usually juicy, round, brightly coloured, sweet or sour, and do not have a stone or pit, although seeds may be present as e.g. blackberry, blueberry, cranberry, currant, elderberry, gooseberry, grape, raspberry, strawberry.

Ornamentals are plants grown for decorative purposes in gardens and landscape design, as houseplants, for cut flowers and specimen display, e.g. roses, chrysanthemums, tulips, etc.

An individual embodiment refers to an active compound combination according to the present invention, wherein the compound of group (II) is selected from the group consisting of Biological Control Agent (BCA) Groups (1) to (7).

Mixing Ratio

The compounds of the formula (I) and the biological control agent as defined above of the mixture or composition according to the invention can be combined in any specific ratio between these two mandatory components. A biological control agent is generally provided in form of a carrier such as a solution or powder or suspension comprising the biological control agent (e.g. in form of viable spores or conidia or an extract). In one preferred embodiment, the amount of viable spores or conidia per gram compound of formula (I) in a mixture or composition according to the invention normally provided in/on a carrier is at least $10^7$ viable spores or conidia/g compound of formula (I), such as between $10^7$ and $10^{14}$ viable spores or conidia/g compound of formula (I), more preferably at least $10^8$ viable spores or conidia/g compound of formula (I), such as between $10^8$ and $5 \times 10^{13}$ viable spores or conidia/g compound of formula (I), or even more preferably at least $10^9$ viable spores or conidia/g compound of formula (I), such as between $10^9$ and $10^{13}$ viable spores or conidia/g compound of formula (I).

The term "viability" of spores or conidia refers to the ability of spores or conidia to germinate at standard conditions and under sufficient supply of nutritions, water, light and/or further support such as growth media. Viability of spores and conidia can be easily determined by a person skilled in the art, e.g. by counting colonies formed by spores/conidia on a growth medium suitable for species to be tested. In addition, many assays are available in the art to determine viability of spores and/or conidia, e.g., Chen et al (Can. J. Plant Pathol., 24; 230-232 (2002); Paul et al (Biotech. And Bioengeneering, 42; 11-23 (1993); Panahiam et al (International Research Journal of Applied and Basic Science, 3(2); 292-298 (2012) or Laflamme et al (J. of applied Microbiol. 96; 684-692 (2004)).

In one preferred embodiment, wherein the biological control agent is a natural extract or simulated blend, the ratio is measured in view of the amount of biological active agent(s) in the extract or simulated blend. Thus, the ratio of an extract or simulated blend is based on the amount of active ingredient and not on the amount of the whole extract or blend. For example, a weight ratio of 1:1 of a compound according to formula (I) and a biological control agent (II) in form of a natural extract or simulated blend with 16.75% (w/w) active ingredient(s), such as terpenes, refers to a mixture or composition comprising, e.g., 1 g of a compound according to formula (I) and 5.97 g of the natural extract or simulated blend comprising 16.75% active ingredient(s) (biological control agent (II)), i.e. 1 g active ingredient(s) (biological control agent (II)) resulting in a 1:1 mixture in view of a compound of formula (I) and the active ingredient(s) (biological control agent (II)).

Thus, in one preferred embodiment, the mixing ratio in mixtures of a compound of formula (I) and natural extracts or simulated blend of, e.g., *Chenopodium ambrosioides* is 1500:1 to 1:2000. Such as 1:1 to 1:2000 or 1:1 to 1:2000 or 1:1 to 1:1500 or 1:10 to 1:1500 or 1:1 to 1:250 or 1:5 to 1:100 or 1:10 to 1:25. One natural extract or simulated blend of *Chenopodium ambrosioides* is known as Requiem. The active ingredient(s) concentration in Requiem is 16.75% (w/w) terpenes, i.e. a mixture of α-terpinene, p-cymene and limonene. As outlined above, the weight ratio of a compound of formula (I) and active ingredient(s) of Requiem can be calculated by using the concentration of said active ingredients in the natural extract or simulated blend. The skilled person is aware how to calculate the concentration of, e.g., terpenes. Analytical methods are known from, e.g., Goren et al (0939D5075/2003/0900D0687 Verlag der Zeitschrift fur Naturforschung, Tubingen, (2003), http://www.znaturforsch.com); Kimball et al (J. of Chrom. Science, 42; 245-249 (2004), Davidowski, Perkin Elmer for the Better, http://www.perkinelmer.com/Content/applicationnotes/app_limoneneincitrusrindsbygcms.pdf In another preferred embodiment, the mixing ratio in mixtures or compositions of a compound of formula (I) and fungi (which are, e.g. provided in form of a solution or solid form (e.g. a powder) with viable conidia and/or spores) is between $10^7$ and $10^{14}$ viable spores or conidia/g compound of formula (I), preferably between $10^8$ and $10^{13}$ viable spores or conidia/g compound of formula (I), more preferably between $10^9$ and $10^{13}$ viable spores or conidia/g compound of formula (I), even more preferably between $10^{10}$ and $10^{12}$ viable spores or conidia/g compound of formula (I).

For example, the ratio of viable conidia of *Metarhizium anisopliae* (e.g. Met 52, e.g., with a concentration of $5\times10^9$ viable conidia/g solid form carrier) per gr compound of formula (I)) is preferably between $10^8$ and $10^{13}$ viable conidia/g compound of formula (I), more preferably between $10^9$ and $10^{13}$ viable conidia/g compound of formula (I), even more preferably between $10^{10}$ and $10^{12}$ viable conidia/g compound of formula (I) such as between $3\times10^{10}$ and $7\times10^{11}$ viable conidia/g compound of formula (I).

For example, the ratio of viable spores of *Paecilomyces fumosoroseus* (e.g. PreFeRal, for example with a concentration of $2\times10^9$ viable spores/g solution) per gr compound of formula (I)) is preferably between $10^8$ and $10^{13}$ viable spores/g compound of formula (I), more preferably between $10^9$ and $10^{13}$ viable spores/g compound of formula (I), even more preferably between $10^{10}$ and $10^{13}$ viable spores/g compound of formula (I) such as between $10^{11}$ and $3\times10^{12}$ viable spores/g compound of formula (I).

For example, the ratio of viable spores of *Beauveria bassiana* (e.g., Naturalis-L, for example with a concentration of $2.3\times10^7$ viable spores/ml solution) per gr compound of formula (I)) is preferably between $10^8$ and $10^{13}$ viable spores/g compound of formula (I), more preferably between $10^9$ and $10^{13}$ viable spores/g compound of formula (I), even more preferably between $5\times10^9$ and $10^{12}$ viable spores/g compound of formula (I) such as between $5\times10^9$ and $5\times10^{11}$ viable spores/g compound of formula (I).

For example, the ratio of viable spores of *Paecilomyces lilacinus* (e.g., *Paecilomyces lilacinus* strain 251 (BioAct), for example with a concentration of $10^{10}$ viable spores/g carrier) per gr compound of formula (I)) is preferably between $10^8$ and $10^{14}$ viable spores/g compound of formula (I), more preferably between $10^{10}$ and $10^{14}$ viable spores/g compound of formula (I), even more preferably between $5\times10^{11}$ and $5\times10^{13}$ viable spores/g compound of formula (I) such as between $10^{12}$ and $5\times10^{13}$ viable spores/g compound of formula (I).

In another preferred embodiment, the mixing ratio in mixtures or compositions of a compound of formula (I) and bacteria (which are, e.g. provided in form of a solution or solid form (e.g. a powder) with viable spores) is between $10^7$ and $10^{14}$ viable spores/g compound of formula (I), preferably between $10^8$ and $10^{13}$ viable spores/g compound of formula (I), more preferably between $10^9$ and $10^{13}$ viable spores/g compound of formula (I), even more preferably between $10^{10}$ and $10^{12}$ viable spores/g compound of formula (I).

For example, the ratio of viable spores of *Bacillus thuringiensis* (e.g., *B. thuringiensis* subsp. *aizawai* ABTS-1857 (XenTari), for example with a concentration of 1.5×10 viable spores/g carrier) per gr compound of formula (I) is preferably between $10^8$ and $10^{13}$ viable spores/g compound of formula (I), more preferably between $10^8$ and $10^{11}$ viable spores/g compound of formula (I), even more preferably between $10^9$ and $10^{11}$ viable spores/g compound of formula (I) such as between $10^9$ and $5\times10^{10}$ viable spores/g compound of formula (I).

For example, the ratio of viable spores of *Bacillus firmus* (including but not limited to strain CNCM I-1582, for example with a concentration of $1.5\times10^7$ viable spores/g carrier) per gr compound of formula (I) is preferably between $10^8$ and $10^{13}$ viable spores/g compound of formula (I), more preferably between $10^8$ and $10^{11}$ viable spores/g compound of formula (I), even more preferably between $10^9$ and $10^{11}$ viable spores/g compound of formula (I) such as between $10^9$ and $5\times10^{10}$ viable spores/g compound of formula (I).

The insecticidal and/or acaricidal action of the active compound combinations of the invention is, surprisingly, substantially higher than the sum of the actions of the individual active compounds. The unforeseeable effect is a true synergistic effect and not merely a complementarity of action.

The active compound combinations comprise the compound of the formula (I) and the compound of group (TI) preferably in synergistically effective amounts.

When the active compounds are present in the active compound combinations of the invention in certain proportions by weight, the synergistic effect is particularly marked. However, the weight ratios of the active compounds in the active compound combinations can be varied within a relatively broad range. Generally speaking, the combinations according to the invention comprise active compounds of the formula (I) and the co-components in the preferred, particularly preferred and very particularly preferred proportions indicated in the tables which now follow:

*The mixing ratios are based on weight ratios. The ratio is to be understood as meaning active compound of the formula (I): Co-component

| Co-component | Preferred mixing ratio | Particularly preferred mixing ratio | Very particularly preferred mixing ratio |
|---|---|---|---|
| Requiem | 1:10-1:10.000 | 1:100-1:5.000 | 1:1000 |
| limonene | 1:1-1:1.000 | 1:10-1:500 | 1:200 |

Additional Mixing Partners

Furthermore, the active compound combinations according to the invention may contain one or more further active substances selected from a fungicide, an insecticide or a biological control agent, i.e. at least one further fungicidally or insecticidally active additive. Preferably, such further active additive is selected from groups (1) to (30) mentioned below. The active compounds identified here by their common names are known and are described, for example, in the pesticide handbook ("The Pesticide Manual" 16th Ed., British Crop Protection Council 2012) or can be found on the Internet (e.g. http://www.alanwood.net/pesticides). The classification is based on the current IRAC Mode of Action Classification Scheme at the time of filing of this patent application.

(1) Acetylcholinesterase (AChE) inhibitors, preferably carbamates selected from alanycarb, aldicarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, triazamate, trimethacarb, XMC and xylylcarb, or organophosphates selected from acephate, azamethiphos, azinphos-ethyl, azinphos-methyl, cadusafos, chlorethoxyfos, chlorfenvinphos, chlormephos, chlorpyrifos-methyl, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, fosthiazate, heptenophos, imicyafos, isofenphos, isopropyl O-(methoxyaminothiophosphoryl) salicylate, isoxathion, malathion, mecarbam, methamidophos, methidathion, mevinphos, monocrotophos, naled, omethoate, oxydemeton-methyl, parathion-methyl, phenthoate, phorate, phosalone, phosmet, phosphamidon, phoxim, pirimiphosmethyl, profenofos, propetamphos, prothiofos, pyraclofos, pyridaphenthion, quinalphos, sulfotep, tebupirimfos, temephos, terbufos, tetrachlorvinphos, thiometon, triazophos, triclorfon and vamidothion.
(2) GABA-gated chloride channel blockers, preferably cyclodiene-organochlorines selected from chlordane and endosulfan or phenylpyrazoles (fiproles), for example ethiprole and fipronil.
(3) Sodium channel modulators, preferably pyrethroids selected from acrinathrin, allethrin, d-cis-trans allethrin, d-trans allethrin, bifenthrin, bioallethrin, bioallethrin s-cyclopentenyl isomer, bioresmethrin, cyprothrin, cyfluthrin, beta-cyfluthrin, cyhalothrin, lambda-cyhalothrin, gamma-cyhalothrin, cypermethrin, alpha-cypermethrin, beta-cypermethrin, theta-cypermethrin, zeta-cypermethrin, cyphenothrin [(1R)-trans-isomer], deltamethrin, empenthrin [(EZ)-(1R)-isomer], esfenvalerate, etofenprox, fenpropathrin, fenvalerate, flucythrinate, flumethrin, tau-fluvalinate, halfenprox, imiprothrin, kadethrin, momfluorothrin, permethrin, phenothrin [(1R)-trans-isomer], prallethrin, pyrethrins (pyrethrum), resmethrin, silafluofen, tefluthrin, tetramethrin, tetramethrin [(1R)-isomer)], tralomethrin and transfluthrin or DDT or methoxychlor.
(4) Nicotinic acetylcholine receptor (nAChR) competitive modulators, preferably neonicotinoids selected from acetamiprid, clothianidin, dinotefuran, imidacloprid, nitenpyram, thiacloprid and thiamethoxam or nicotine or sulfoxaflor or flupyradifurone.
(5) Nicotinic acetylcholine receptor (nAChR) allosteric modulators, preferably spinosyns selected from spinetoram and spinosad.
(6) Glutamate-gated chloride channel (GluCl) allosteric modulators, preferably avermectins/milbemycins selected from abamectin, emamectin benzoate, lepimectin and milbemectin.
(7) Juvenile hormone mimics, preferably juvenile hormone analogues selected from hydroprene, kinoprene and methoprene, or fenoxycarb or pyriproxyfen.
(8) Miscellaneous non-specific (multi-site) inhibitors, preferably alkyl halides selected from methyl bromide and other alkyl halides, or chloropicrine or sulphuryl fluoride or borax or tartar emetic or methyl isocyanate generators selected from diazomet and metam.
(9) Chordotonal organ TRPV channel modulators selected from pymetrozine and pyrifluquinazone.
(10) Mite growth inhibitors selected from clofentezine, hexythiazox, diflovidazin and etoxazole.
(11) Microbial disruptors of the insect gut membrane selected from *Bacillus thuringiensis* subspecies *israelensis, Bacillus sphaericus, Bacillus thuringiensis* subspecies *aizawai, Bacillus thuringiensis* subspecies *kurstaki, Bacillus thuringiensis* subspecies *tenebrionis*, and B.t. plant proteins selected from Cry1Ab, Cry1Ac, Cry1Fa, Cry1A.105, Cry2Ab, Vip3A, mCry3A, Cry3Ab, Cry3Bb and Cry34Ab1/35Ab1.
(12) Inhibitors of mitochondrial ATP synthase, preferably ATP disruptors selected from diafenthiuron, or organotin compounds selected from azocyclotin, cyhexatin and fenbutatin oxide, or propargite or tetradifon.
(13) Uncouplers of oxidative phosphorylation via disruption of the proton gradient selected from chlorfenapyr, DNOC and sulfluramid.
(14) Nicotinic acetylcholine receptor channel blockers selected from bensultap, cartap hydrochloride, thiocylam and thiosultap-sodium.
(15) Inhibitors of chitin biosynthesis, type 0, selected from bistrifluron, chlorfluazuron, diflubenzuron, flucycloxuron, flufenoxuron, hexaflumuron, lufenuron, novaluron, noviflumuron, teflubenzuron and triflumuron.
(16) Inhibitors of chitin biosynthesis, type 1 selected from buprofezin.
(17) Moulting disruptor (in particular for *Diptera*, i.e. dipterans) selected from cyromazine.
(18) Ecdysone receptor agonists selected from chromafenozide, halofenozide, methoxyfenozide and tebufenozide.
(19) Octopamine receptor agonists selected from amitraz.
(20) Mitochondrial complex III electron transport inhibitors selected from hydramethylnone, acequinocyl and fluacrypyrim.
(21) Mitochondrial complex I electron transport inhibitors, preferably METI acaricides selected from fenazaquin, fenpyroximate, pyrimidifen, pyridaben, tebufenpyrad and tolfenpyrad, or rotenone (*Derris*).
(22) Voltage-dependent sodium channel blockers selected from indoxacarb and metaflumizone.
(23) Inhibitors of acetyl CoA carboxylase, preferably tetronic and tetramic acid derivatives selected from spirodiclofen, spiromesifen and spirotetramat.
(24) Mitochondrial complex IV electron transport inhibitors, preferably phosphines selected from aluminium phosphide, calcium phosphide, phosphine and zinc phosphide, or cyanides selected from calcium cyanide, potassium cyanide and sodium cyanide.
(25) Mitochondrial complex II electron transport inhibitors, preferably beta-ketonitrile derivatives selected from cyenopyrafen and cyflumetofen, and carboxanilides selected from pyflubumide.
(28) Ryanodine receptor modulators, preferably diamides selected from chlorantraniliprole, cyantraniliprole and flubendiamide.
(29) Chordotonal organ Modulators (with undefined target site) selected from flonicamid.
(30) further active compounds selected from Afidopyropen, Afoxolaner, Azadirachtin, Benclothiaz, Benzoximate, Bifenazate, Broflanilide, Bromopropylate, Chinomethionat, Chloroprallethrin, Cryolite, Cyclaniliprole, Cycloxaprid, Cyhalodiamide, Dicloromezotiaz, Dicofol, epsilon-Metofluthrin, epsilon-Momfluthrin, Flometoquin, Fluazaindolizine, Fluensulfone, Flufenerim, Flufenoxystrobin, Flufiprole, Fluhexafon, Fluopyram, Fluralaner, Fluxametamide, Fufenozide, Guadipyr, Heptafluthrin, Imidaclothiz, Iprodione, kappa-Bifenthrin, kappa-Tefluthrin, Lotilaner, Meperfluthrin, Paichongding, Pyridalyl, Pyrifluquinazon, Pyriminostrobin, Spirobudiclofen, Tetramethylfluthrin, Tetraniliprole, Tetrachlorantraniliprole, Tigolaner, Tioxazafen, Thiofluoximate, Triflumezopyrim and iodomethane; furthermore preparations based on *Bacillus firmus* (I-1582, BioNeem, Votivo), and also the following compounds: 1-{2-fluoro-4-methyl-5-[(2,2,2-trifluoroethyl)sulphinyl]phenyl}-3-(trifluoromethyl)-1H-1,2,4-triazole-5-amine (known from WO2006/043635) (CAS 885026-50-6), {1'-[(2E)-3-(4-chlorophenyl)prop-2-en-1-yl]-5-fluorospiro[indol-3,4'-piperidin]-1(2H)-yl}(2-chloropyridin-4-yl)methanone (known from WO2003/106457) (CAS 637360-23-7), 2-chloro-N-[2-{1-[(2E)-3-(4-chlorophenyl)prop-2-en-1-yl]piperidin-4-yl}-4-(trifluoromethyl)phenyl]isonicotinamide (known from WO2006/003494) (CAS 872999-66-1), 3-(4-chloro-2, 6-dimethylphenyl)-4-hydroxy-8-methoxy-1,8-diazaspiro[4.5]dec-3-en-2-one (known from WO 2010052161) (CAS 1225292-17-0), 3-(4-chloro-2,6-dimethylphenyl)-8-methoxy-2-oxo-1,8-diazaspiro[4.5]dec-3-en-4-yl ethyl carbonate (known from EP2647626) (CAS 1440516-42-6), 4-(but-2-yn-1-yloxy)-6-(3,5-dimethylpiperidin-1-yl)-5-fluoropyrimidine (known from WO2004/099160) (CAS 792914-58-0), PF1364 (known from JP2010/018586) (CAS 1204776-60-2), N-[(2E)-1-[(6-chloropyridin-3-yl)methyl]pyridin-2(1H)-ylidene]-2,2,2-trifluoroacetamide (known from WO2012/029672) (CAS 1363400-41-2), (3E)-3-[1-[(6-chloro-3-pyridyl)methyl]-2-pyridylidene]-1,1,1-trifluoro-propan-2-one (known from WO2013/144213) (CAS 1461743-15-6), N-[3-(benzylcarbamoyl)-4-chlorophenyl]-1-methyl-3-(pentafluoroethyl)-4-(trifluoromethyl)-1H-pyrazole-5-carboxamide (known from WO2010/051926) (CAS 1226889-14-0), 5-bromo-4-chloro-N-[4-chloro-2-methyl-6-(methylcarbamoyl)phenyl]-2-(3-chloro-2-pyridyl)pyrazole-3-carboxamide (known from CN103232431) (CAS 1449220-44-3), 4-[5-(3,5-dichlorophenyl)-4,5-dihydro-5-(trifluoromethyl)-3-isoxazolyl]-2-methyl-N-(cis-1-oxido-3-thietanyl)-benzamide, 4-[5-(3,5-dichlorophenyl)-4,5-dihydro-5-(trifluoromethyl)-3-isoxazolyl]-2-methyl-N-(trans-1-oxido-3-thietanyl)-benzamide and 4-[(5S)-5-(3,5-dichlorophenyl)-4,5-dihydro-5-(trifluoromethyl)-3-isoxazolyl]-2-methyl-N-(cis-1-oxido-3-thietanyl)benzamide (known from WO 2013/050317 A1) (CAS 1332628-83-7), N-[3-chloro-1-(3-pyridinyl)-1H-pyrazol-4-yl]-N-ethyl-3-[(3,3,3-trifluoropropyl)sulfinyl]-propanamide, (+)-N-[3-chloro-1-(3-pyridinyl)-1H-pyrazol-4-yl]-N-ethyl-3-[(3,3,3-trifluoropropyl)sulfinyl]-propanamide and (−)-N-[3-chloro-1-(3-pyridinyl)-1H-pyrazol-4-yl]-N-ethyl-3-[(3,3,3-trifluoropropyl)sulfinyl]-propanamide (known from WO 2013/162715 A2, WO 2013/162716 A2, US 2014/0213448 A1) (CAS 1477923-37-7), 5-[[(2E)-3-chloro-2-propen-1-yl]amino]-1-[2,6-dichloro-4-(trifluoromethyl)phenyl]-4-[(trifluoromethyl)sulfinyl]-1H-pyrazole-3-carbonitrile (known from CN 101337937 A) (CAS 1105672-77-2), 3-bromo-N-[4-chloro-2-methyl-6-[(methylamino)thioxomethyl]phenyl]-1-(3-chloro-2-pyridinyl)-1H-pyrazole-5-carboxamide, (Liudaibenjiaxuanan, known from CN 103109816 A) (CAS 1232543-85-9); N-[4-chloro-2-[[(1,1-dimethylethyl)amino]carbonyl]-6-methylphenyl]-1-(3-chloro-2-pyridinyl)-3-(fluoromethoxy)-1H-Pyrazole-5-carboxamide (known from WO 2012/034403 A1) (CAS 1268277-22-0), N-[2-(5-amino-1,3,4-thiadiazol-2-yl)-4-chloro-6-methylphenyl]-3-bromo-1-(3-chloro-2-pyridinyl)-1H-pyrazole-5-carboxamide (known from WO 2011/085575 A1) (CAS 1233882-22-8), 4-[3-[2,6-dichloro-4-[(3,3-dichloro-2-propen-1-yl)oxy]phenoxy]propoxy]-2-methoxy-6-(trifluoromethyl)-pyrimidine (known from CN 101337940 A) (CAS 1108184-52-6); (2E)- and 2(Z)-2-[2-(4-cyanophenyl)-1-[3-(trifluoromethyl)phenyl]ethylidene]-N-[4-(difluoromethoxy)phenyl]-hydrazinecarboxamide (known from CN 101715774 A) (CAS 1232543-85-9); 3-(2,2-dichloroethenyl)-2,2-dimethyl-4-(1H-benzimidazol-2-yl)phenyl-cyclopropanecarboxylic acid ester (known from CN 103524422 A) (CAS 1542271-46-4); (4aS)-7-chloro-2,5-dihydro-2-[[(methoxycarbonyl)[4-[(trifluoromethyl)thio]phenyl]amino]carbonyl]-indeno[1,2-e][1,3,4]oxadiazine-4a(3H)-carboxylic acid methyl ester (known from CN 102391261 A) (CAS 1370358-69-2); 6-deoxy-3-O-ethyl-2,4-di-O-methyl-,1-[N-[4-[1-[4-(1,1,2,2,2-pentafluoroethoxy)phenyl]-1H-1,2,4-triazol-3-yl]phenyl]carbamate]-α-L-mannopyranose (known from US 2014/0275503 A1) (CAS 1181213-14-8); 8-(2-cyclopropylmethoxy-4-trifluoromethyl-phenoxy)-3-(6-trifluoromethyl-pyridazin-3-yl)-3-aza-bicyclo[3.2.1]octane (CAS 1253850-56-4), (8-anti)-8-(2-cyclopropylmethoxy-4-trifluoromethyl-phenoxy)-3-(6-trifluoromethyl-pyridazin-3-yl)-3-aza-bicyclo[3.2.1]octane (CAS 933798-27-7), (8-syn)-8-(2-cyclopropylmethoxy-4-trifluoromethyl-phenoxy)-3-(6-trifluoromethyl-pyridazin-3-yl)-3-aza-bicyclo[3.2.1]octane (known from WO 2007040280 A1, WO 2007040282 A1) (CAS 934001-66-8), N-[3-chloro-1-(3-pyridinyl)-1H-pyrazol-4-yl]-N-ethyl-3-[(3,3,3-trifluoropropyl)thio]-propanamide (known from WO 2015/058021 A1, WO 2015/058028 A1) (CAS 1477919-27-9) and N-[4-(aminothioxomethyl)-2-methyl-6-[(methylamino)carbonyl]phenyl]-3-bromo-1-(3-chloro-2-pyridinyl)-1H-pyrazole-5-carboxamide (known from CN 103265527 A) (CAS 1452877-50-7), 5-(1,3-dioxan-2-yl)-4-[[4-(trifluoromethyl)phenyl]methoxy]-pyrimidine (known from WO 2013/115391 A1) (CAS 1449021-97-9), 3-(4-chloro-2,6-dimethylphenyl)-4-hydroxy-8-methoxy-1-methyl-1,8-diazaspiro[4.5]dec-3-en-2-one (known from WO 2010/066780 A1, WO 2011/151146 A1) (CAS 1229023-34-0), 3-(4-chloro-2,6-dimethylphenyl)-8-methoxy-1-methyl-1,8-diazaspiro[4.5]decane-2,4-dione (known from WO 2014/187846 A1) (CAS 1638765-58-8), 3-(4-chloro-2,6-dimethylphenyl)-8-methoxy-1-methyl-2-oxo-1,8-diazaspiro[4.5]dec-3-en-4-yl-carbonic acid ethyl ester (known from WO 2010/066780 A1, WO 2011151146 A1) (CAS 1229023-00-0), N-[1-[(6-chloro-3-pyridinyl)methyl]-2(1H)-pyridinylidene]-2,2,2-trifluoro-acetamide (known from DE 3639877 A1, WO 2012029672 A1) (CAS 1363400-41-2), [N(E)]-N-[1-[(6-chloro-3-pyridinyl)methyl]-2(1H)-pyridinylidene]-2,2,2-trifluoro-acetamide, (known from WO 2016005276 A1) (CAS 1689566-03-7), [N(Z)]-N-[1-[(6-chloro-3-pyridinyl)methyl]-2(1H)-pyridinylidene]-2,2,2-trifluoro-acetamide, (CAS 1702305-40-5), 3-endo-3-[2-propoxy-4-(trifluoromethyl)phenoxy]-9-[[5-(trifluoromethyl)-2-pyridinyl]oxy]-9-azabicyclo[3.3.1]nonane (known from WO 2011/105506 A1, WO 2016/133011 A1) (CAS 1332838-17-1).

Pests:

The active compound combinations can preferably be used as pesticides. They are active against normally sensitive and resistant species and against all or some stages of development. The abovementioned pests include:

pests from the phylum of the Arthropoda, in particular from the class of the Arachnida, for example *Acarus* spp., for example *Acarus siro, Aceria kuko, Aceria sheldoni, Aculops* spp., *Aculus* spp., for example *Aculus fockeui, Aculus schlechtendali, Amblyomma* spp., *Amphitetranychus viennensis, Argas* spp., *Boophilus* spp., *Brevipalpus* spp., for example *Brevipalpus phoenicis, Bryobia graminum, Bryobia praetiosa, Centruroides* spp., *Chorioptes* spp., *Dermanyssus gallinae, Dermatophagoides pteronyssinus, Dermatophagoides farinae, Dermacentor* spp., *Eotetranychus* spp., for example *Eotetranychus hicoriae, Epitrimerus pyri, Eutetranychus* spp., for example *Eutetranychus banksi, Eriophyes* spp., for example *Eriophyes pyri, Glycypha-* gus domesticus, Halotydeus destructor, Hemitarsonemus spp., for example Hemitarsonemus latus (=Polyphagotarsonemus latus), Hyalomma spp., Ixodes spp., Latrodectus spp., Loxosceles spp., Neutrombicula autumnalis, Nuphersa spp., Oligonychus spp., for example Oligonychus coffeae, Oligonychus coniferarum, Oligonychus ilicis, Oligonychus indicus, Oligonychus mangiferus, Oligonychus pratensis, Oligonychus punicae, Oligonychus yothersi, Ornithodorus spp., Ornithonyssus spp., Panonychus spp., for example Panonychus citri (=Metatetranychus citri), Panonychus ulmi (=Metatetranychus ulmi), Phyllocoptruta oleivora, Platytetranychus multidigituli, Polyphagotarsonemus latus, Psoroptes spp., Rhipicephalus spp., Rhizoglyphus spp., Sarcoptes spp., Scorpio maurus, Steneotarsonemus spp., Steneotarsonemus spinki, Tarsonemus spp., for example Tarsonemus confusus, Tarsonemus pallidus, Tetranychus spp., for example Tetranychus canadensis, Tetranychus cinnabarinus, Tetranychus turkestani, Tetranychus urticae, Trombicula alfreddugesi, Vaejovis spp., Vasates lycopersici;

from the class of the Chilopoda, for example Geophilus spp., Scutigera spp.;

from the order or the class of the Collembola, for example Onychiurus armatus; Sminthurus viridis;

from the class of the Diplopoda, for example Blaniulus guttulatus;

from the class of the Insecta, for example from the order of the Blattodea, for example Blatta orientalis, Blattella asahinai, Blattella germanica, Leucophaea maderae, Loboptera decipiens, Neostylopyga rhombifolia, Panchlora spp., Parcoblatta spp., Periplaneta spp., for example Periplaneta americana, Periplaneta australasiae, Pycnoscelus surinamensis, Supella longipalpa;

from the order of the Coleoptera, for example Acalymma vittatum, Acanthoscelides obtectus, Adoretus spp., Aethina tumida, Agelastica alni, Agrilus spp., for example Agrilus planipennis, Agrilus coxalis, Agrilus bilineatus, Agrilus anxius, Agriotes spp., for example Agriotes linneatus, Agriotes mancus, Alphitobius diaperinus, Amphimallon solstitialis, Anobium punctatum, Anoplophora spp., for example Anoplophora glabripennis, Anthonomus spp., for example Anthonomus grandis, Anthrenus spp., Apion spp., Apogonia spp., Atomaria spp., for example Atomaria linearis, Attagenus spp., Baris caerulescens, Bruchidius obtectus, Bruchus spp., for example Bruchus pisorum, Bruchus rufimanus, Cassida spp., Cerotoma trifurcata, Ceutorrhynchus spp., for example Ceutorrhynchus assimilis, Ceutorrhynchus quadridens, Ceutorrhynchus rapae, Chaetocnema spp., for example Chaetocnema confinis, Chaetocnema denticulata, Chaetocnema ectypa, Cleonus mendicus, Conoderus spp., Cosmopolites spp., for example Cosmopolites sordidus, Costelytra zealandica, Ctenicera spp., Curculio spp., for example Curculio caryae, Curculio caryatrypes, Curculio obtusus, Curculio sayi, Cryptolestes ferrugineus, Cryptolestes pusillus, Cryptorhynchus lapathi, Cryptorhynchus mangiferae, Cylindrocopturus spp., Cylindrocopturus adspersus, Cylindrocopturus furnissi, Dendroctonus spp., for example Dendroctonus ponderosae, Dermestes spp., Diabrotica spp., for example Diabroticabalteata, Diabroticabarberi, Diabrotica undecimpunctatahowardi, Diabrotica undecimpunctata undecimpunctata, Diabrotica virgifera virgifera, Diabrotica virgifera zeae, Dichocrocis spp., Dicladispa armigera, Diloboderus spp., Epicaerus spp., Epilachna spp., for example Epilachna borealis, Epilachna varivestis, Epitrix spp., for example Epitrix cucumeris, Epitrix fuscula, Epitrix hirtipennis, Epitrix subcrinita, Epitrix tuberis, Faustinus spp., Gibbium psylloides, Gnathocerus cornutus, Hellula undalis, Heteronychus arator, Heteronyx spp., Hylamorpha elegans, Hylotrupes bajulus, Hypera postica, Hypomeces squamosus, Hypothenemus spp., for example Hypothenemus hampei, Hypothenemus obscurus, Hypothenemus pubescens, Lachnosterna consanguinea, Lasioderma serricorne, Latheticus oryzae, Lathridius spp., Lema spp., Leptinotarsa decemlineata, Leucoptera spp., for example Leucoptera coffeella, Limonius ectypus, Lissorhoptrus oryzophilus, Listronotus (=Hyperodes) spp., Lixus spp., Luperodes spp., Luperomorpha xanthodera, Lyctus spp., Megacyllene spp., for example Megacyllene robiniae, Megascelis spp., Melanotus spp., for example Melanotus longulus oregonensis, Meligethes aeneus, Melolontha spp., for example Melolontha melolontha, Migdolus spp., Monochamus spp., Naupactus xanthographus, Necrobia spp., Neogalerucella spp., Niptus hololeucus, Oryctes rhinoceros, Oryzaephilus surinamensis, Oryzaphagus oryzae, Otiorhynchus spp., for example Otiorhynchus cribricollis, Otiorhynchus ligustici, Otiorhynchus ovatus, Otiorhynchus rugosostriarus, Otiorhynchus sulcatus, Oulema spp., for example Oulema melanopus, Oulema oryzae, Oxycetonia jucunda, Phaedon cochleariae, Phyllophaga spp., Phyllophaga helleri, Phyllotreta spp., for example Phyllotreta armoraciae, Phyllotreta pusilla, Phyllotreta ramosa, Phyllotreta striolata, Popillia japonica, Premnotrypes spp., Prostephanus truncatus, Psylliodes spp., for example Psylliodes affinis, Psylliodes chrysocephala, Psylliodes punctulata, Ptinus spp., Rhizobius ventralis, Rhizopertha dominica, Rhynchophorus spp., Rhynchophorus ferrugineus, Rhynchophorus palmarum, Scolytus spp., for example Scolytus multistriatus, Sinoxylon perforans, Sitophilus spp., for example Sitophilus granarius, Sitophilus linearis, Sitophilus oryzae, Sitophilus zeamais, Sphenophorus spp., Stegobium paniceum, Sternechus spp., for example Sternechus paludatus, Symphyletes spp., Tanymecus spp., for example Tanymecus dilaticollis, Tanymecus indicus, Tanymecus palliatus, Tenebrio molitor, Tenebrioides mauretanicus, Tribolium spp., for example Tribolium audax, Tribolium castaneum, Tribolium confusum, Trogoderma spp., Tychius spp., Xylotrechus spp., Zabrus spp., for example Zabrus tenebrioides;

from the order of the Dermaptera, for example Anisolabis maritime, Forficula auricularia, Labidura riparia;

from the order of the Diptera, for example Aedes spp., for example Aedes aegypti, Aedes albopictus, Aedes sticticus, Aedes vexans, Agromyza spp., for example Agromyza frontella, Agromyza parvicornis, Anastrepha spp., Anopheles spp., for example Anopheles quadrimaculatus, Anopheles gambiae, Asphondylia spp., Bactrocera spp., for example Bactrocera cucurbitae, Bactrocera dorsalis, Bactrocera oleae, Bibio hortulanus, Calliphora erythrocephala, Calliphora vicina, Ceratitis capitata, Chironomus spp., Chrysomya spp., Chrysops spp., Chrysozona pluvialis, Cochliomya spp., Contarinia spp., for example Contarinia johnsoni, Contarinia nasturtii, Contarinia pyrivora, Contarinia schulzi, Contarinia sorghicola, Contarinia tritici, Cordylobia anthropophaga, Cricotopus sylvestris, Culex spp., for example Culex pipiens, Culex quinquefasciatus, Culicoides spp., Culiseta spp., Cuterebra spp., Dacus oleae, Dasineura spp., for example Dasineura brassicae, Delia spp., for example Delia antiqua, Delia coarctata, Delia florilega, Delia platura, Delia radicum, Dermatobia hominis, Drosophila spp., for example Drosphila melanogaster, Drosophila suzukii, Echinocnemus spp., Euleia heraclei, Fannia spp., Gasterophilus spp., Glossina spp., Haematopota spp., Hydrellia spp., Hydrellia griseola, Hylemya spp., Hippobosca spp., Hypoderma spp., Liriomyza spp., for example Liriomyza brassicae, Liriomyza huidobrensis, Liriomyza sativae, Lucilia spp., for example Lucilia cuprina, Lutzomyia spp., Mansonia spp., Musca spp., for example Musca domestica, Musca domestica vicina, Oestrus spp., Oscinella frit, Paratanytarsus spp., Paralauterborniella subcincta, Pegomya or Pegomyia spp., for example Pegomya betae, Pegomya hyoscyami, Pegomya rubivora, Phlebotomus spp., Phorbia spp., Phormia spp., Piophila casei, Platyparea poeciloptera, Prodiplosis spp., Psila rosae, Rhagoletis spp., for example Rhagoletis cingulata, Rhagoletis completa, Rhagoletis fausta, Rhagoletis indifferens, Rhagoletis mendax, Rhagoletis pomonella, Sarcophaga spp., Simulium spp., for example Simulium meridionale, Stomoxys spp., Tabanus spp., Tetanops spp., Tipula spp., for example Tipula paludosa, Tipula simplex, Toxotrypana curvicauda;

from the order of the Hemiptera, for example Acizzia acaciaebaileyanae, Acizzia dodonaeae, Acizzia uncatoides, Acrida turrita, Acyrthosipon spp., for example Acyrthosiphon pisum, Acrogonia spp., Aeneolamia spp., Agonoscena spp., Aleurocanthus spp., Aleyrodes proletella, Aleurolobus barodensis, Aleurothrixus floccosus, Allocaridara malayensis, Amrasca spp., for example Amrasca bigutulla, Amrasca devastans, Anuraphis cardui, Aonidiella spp., for example Aonidiella aurantii, Aonidiella citrina, Aonidiella inornata, Aphanostigma piri, Aphis spp., for example Aphis citricola, Aphis craccivora, Aphis fabae, Aphis forbesi, Aphis glycines, Aphis gossypii, Aphis hederae, Aphis illinoisensis, Aphis middletoni, Aphis nasturtii, Aphis nerii, Aphis pomi, Aphis spiraecola, Aphis viburniphila, Arboridia apicalis, Arytainilla spp., Aspidiella spp., Aspidiotus spp., for example Aspidiotus nerii, Atanus spp., Aulacorthum solani, Bemisia tabaci, Blastopsylla occidentalis, Boreioglycaspis melaleucae, Brachycaudus helichrysi, Brachycolus spp., Brevicoryne brassicae, Cacopsylla spp., for example Cacopsylla pyricola, Calligypona marginata, Capulinia spp., Carneocephala fulgida, Ceratovacuna lanigera, Cercopidae, Ceroplastes spp., Chaetosiphon fragaefolii, Chionaspis tegalensis, Chlorita onukii, Chondracris rosea, Chromaphis juglandicola, Chrysomphalus aonidum, Chrysomphalus ficus, Cicadulina mbila, Coccomytilus halli, Coccus spp., for example Coccus hesperidum, Coccus longulus, Coccus pseudomagnoliarum, Coccus viridis, Cryptomyzus ribis, Cryptoneossa spp., Ctenarytaina spp., Dalbulus spp., Dialeurodes chittendeni, Dialeurodes citri, Diaphorina citri, Diaspis spp., Diuraphis spp., Doralis spp., Drosicha spp., Dysaphis spp., for example Dysaphis apiifolia, Dysaphis plantaginea, Dysaphis tulipae, Dysmicoccus spp., Empoasca spp., for example Empoasca abrupta, Empoasca fabae, Empoasca maligna, Empoasca solana, Empoasca stevensi, Eriosoma spp., for example Eriosoma americanum, Eriosoma lanigerum, Eriosoma pyricola, Erythroneura spp., Eucalyptolyma spp., Euphyllura spp., Euscelis bilobatus, Ferrisia spp., Fiorinia spp., Furcaspis oceanica, Geococcus coffeae, Glycaspis spp., Heteropsylla cubana, Heteropsylla spinulosa, Homalodisca coagulata, Hyalopterus arundinis, Hyalopterus pruni, Icerya spp., for example Icerya purchasi, Idiocerus spp., Idioscopus spp., Laodelphax striatellus, Lecanium spp., for example Lecanium corni (=Parthenolecanium corni), Lepidosaphes spp., for example Lepidosaphes ulmi, Lipaphis erysimi, Lopholeucaspis japonica, Lycorma delicatula, Macrosiphum spp., for example Macrosiphum euphorbiae, Macrosiphum lilii, Macrosiphum rosae, Macrosteles facifrons, Mahanarva spp., Melanaphis sacchari, Metcalfiella spp., Metcalfa pruinosa, Metopolophium dirhodum, Monellia costalis, Monelliopsis pecanis, Myzus spp., for example Myzus ascalonicus, Myzus cerasi, Myzus ligustri, Myzus ornatus, Myzus persicae, Myzus nicotianae, Nasonovia ribisnigri, Neomaskellia spp., Nephotettix spp., for example Nephotettix cincticeps, Nephotettix nigropictus, Nettigoniclla spectra, Nilaparvata lugens, Oncometopia spp., Orthezia praelonga, Oxya chinensis, Pachypsylla spp., Parabemisia myricae, Paratrioza spp., for example Paratrioza cockerelli, Parlatoria spp., Pemphigus spp., for example Pemphigus bursarius, Pemphigus populivenae, Peregrinus maidis, Perkinsiella spp., Phenacoccus spp., for example Phenacoccus madeirensis, Phloeomyzus passerinii, Phorodon humuli, Phylloxera spp., for example Phylloxera devastatrix, Phylloxera notabilis, Pinnaspis aspidistrae, Planococcus spp., for example Planococcus citri, Prosopidopsylla flava, Protopulvinaria pyriformis, Pseudaulacaspis pentagona, Pseudococcus spp., for example Pseudococcus calceolariae, Pseudococcus comstocki, Pseudococcus longispinus, Pseudococcus maritimus, Pseudococcus viburni, Psyllopsis spp., Psylla spp., for example Psylla buxi, Psylla mali, Psylla pyri, Pteromalus spp., Pulvinaria spp., Pyrilla spp., Quadraspidiotus spp., for example Quadraspidiotus juglansregiae, Quadraspidiotus ostreaeformis, Quadraspidiotus perniciosus, Quesada gigas, Rastrococcus spp., Rhopalosiphum spp., for example Rhopalosiphum maidis, Rhopalosiphum oxyacanthae, Rhopalosiphum padi, Rhopalosiphum rufiabdominale, Saissetia spp., for example Saissetia coffeae, Saissetia miranda, Saissetia neglecta, Saissetia oleae, Scaphoideus titanus, Schizaphis graminum, Selenaspidus articulatus, Sipha flava, Sitobion avenae, Sogata spp., Sogatella furcifera, Sogatodes spp., Stictocephala festina, Siphoninus phillyreae, Tenalaphara malayensis, Tetragonocephela spp., Tinocallis caryaefoliae, Tomaspis spp., Toxoptera spp., for example Toxoptera aurantii, Toxoptera citricidus, Trialeurodes vaporariorum, Trioza spp., for example Trioza diospyri, Typhlocyba spp., Unaspis spp., Viteus vitifolii, Zygina spp.;

from the suborder of the Heteroptera, for example Aelia spp., Anasa tristis, Antestiopsis spp., Boisea spp., Blissus spp., Calocoris spp., Campylomma livida, Cavelerius spp., Cimex spp., for example Cimex adjunctus, Cimex hemipterus, Cimex lectularius, Cimex pilosellus, Collaria spp., Creontiades dilutus, Dasynus piperis, Dichelops furcatus, Diconocoris hewetti, Dysdercus spp., Euschistus spp., for example Euschistus heros, Euschistus servus, Euschistus tristigmus, Euschistus variolarius, Eurydema spp., Eurygaster spp., Halyomorpha halys, Heliopeltis spp., Horcias nobilellus, Leptocorisa spp., Leptocorisa varicornis, Leptoglossus occidentalis, Leptoglossus phyllopus, Lygocoris spp., for example *Lygocoris pabulinus, Lygus* spp., for example *Lygus elisus, Lygus hesperus, Lygus lineolaris, Macropes excavatus, Megacopta cribraria, Miridae, Monalonion atratum, Nezara* spp., for example *Nezara viridula, Nysius* spp., *Oebalus* spp., *Pentomidae, Piesma quadrata, Piezodorus* spp., for example *Piezodorus guildinii, Psallus* spp., *Pseudacysta persea, Rhodnius* spp., *Sahlbergella singularis, Scaptocoris castanea, Scotinophora* spp., *Stephanitis nashi, Tibraca* spp., *Triatoma* spp.;

from the order of the Hymenoptera, for example *Acromyrmex* spp., *Athalia* spp., for example *Athalia rosae, Atta* spp., *Camponotus* spp., *Dolichovespula* spp., *Diprion* spp., for example *Diprion similis, Hoplocampa* spp., for example *Hoplocampa cookei, Hoplocampa testudinea, Lasius* spp., *Linepithema* (Iridiomyrmex) *humile, Monomorium pharaonis, Paratrechina* spp., *Paravespula* spp., *Plagiolepis* spp., *Sirex* spp., for example *Sirex noctilio, Solenopsis invicta, Tapinoma* spp., *Technomyrmex albipes, Urocerus* spp., *Vespa* spp., for example *Vespa crabro, Wasmannia auropunctata, Xeris* spp.; from the order of the Isopoda, for example *Armadillidium vulgare, Oniscus asellus, Porcellio scaber*; from the order of the Isoptera, for example *Coptotermes* spp., for example *Coptotermes formosanus, Cornitermes cumulans, Cryptotermes* spp., *Incisitermes* spp., *Kalotermes* spp., *Microtermes obesi, Nasutitermes* spp., *Odontotermes* spp., *Porotermes* spp., *Reticulitermes* spp., for example *Reticulitermes flavipes, Reticulitermes hesperus;* from the order of the Lepidoptera, for example *Achroia grisella, Acronicta major, Adoxophyes* spp., for example *Adoxophyes orana, Aedia leucomelas, Agrotis* spp., for example *Agrotis segetum, Agrotis ipsilon, Alabama* spp., for example *Alabama argillacea, Amyelois transitella, Anarsia* spp., *Anticarsia* spp., for example *Anticarsia gemmatalis, Argyroploce* spp., *Autographa* spp., *Barathra brassicae, Blastodacna atra, Borbo cinnara, Bucculatrix thurberiella, Bupalus piniarius, Busseola* spp., *Cacoecia* spp., *Caloptilia theivora, Capua reticulana, Carpocapsa pomonella, Carposina niponensis, Cheimatobia brumata, Chilo* spp., for example *Chilo plejadellus, Chilo suppressalis, Choreutis pariana, Choristoneura* spp., *Chrysodeixis chalcites, Clysia ambiguella, Cnaphalocerus* spp., *Cnaphalocrocis medinalis, Cnephasia* spp., *Conopomorpha* spp., *Conotrachelus* spp., *Copitarsia* spp., *Cydia* spp., for example *Cydia nigricana, Cydia pomonella, Dalaca noctuides, Diaphania* spp., *Diparopsis* spp., *Diatraea saccharalis, Dioryctria* spp., for example *Dioryctria zimmermani, Earias* spp., *Ecdytolopha aurantium, Elasmopalpus lignosellus, Eldana saccharina, Ephestia* spp., for example *Ephestia elutella, Ephestia kuehniella, Epinotia* spp., *Epiphyas postvittana, Erannis* spp., *Erschoviella musculana, Etiella* spp., *Eudocima* spp., *Eulia* spp., *Eupoecilia ambiguella, Euproctis* spp., for example *Euproctis chrysorrhoea, Euxoa* spp., *Feltia* spp., *Galleria mellonella, Gracillaria* spp., *Grapholitha* spp., for example *Grapholita molesta, Grapholita prunivora, Hedylepta* spp., *Helicoverpa* spp., for example *Helicoverpa armigera, Helicoverpa zea, Heliothis* spp., for example *Heliothis virescens, Hofmannophila pseudospretella, Homoeosoma* spp., *Homona* spp., *Hyponomeuta padella, Kakivoria flavofasciata, Lampides* spp., *Laphygma* spp., *Laspeyresia molesta, Leucinodes orbonalis, Leucoptera* spp., for example *Leucoptera coffeella, Lithocolletis* spp., for example *Lithocolletis blancardella, Lithophane antennata, Lobesia* spp., for example *Lobesia botrana, Loxagrotis albicosta, Lymantria* spp., for example *Lymantria dispar, Lyonetia* spp., for example *Lyonetia clerkella, Malacosoma neustria, Maruca testulalis, Mamestra brassicae, Melanitis leda, Mocis* spp., *Monopis obviella, Mythimna separata, Nemapogon cloacellus, Nymphula* spp., *Oiketicus* spp., *Omphisa* spp., *Operophtera* spp., *Oria* spp., *Orthaga* spp., *Ostrinia* spp., for example *Ostrinia nubilalis, Panolis flammea, Parnara* spp., *Pectinophora* spp., for example *Pectinophora gossypiella, Perileucoptera* spp., *Phthorimaea* spp., for example *Phthorimaea operculella, Phyllocnistis citrella, Phyllonorycter* spp., for example *Phyllonorycter blancardella, Phyllonorycter crataegella, Pieris* spp., for example *Pieris rapae, Platynota stultana, Plodia interpunctella, Plusia* spp., *Plutella xylostella* (=*Plutella maculipennis*), *Podesia* spp., for example *Podesia syringae, Prays* spp., *Prodenia* spp., *Protoparce* spp., *Pseudaletia* spp., for example *Pseudaletia unipuncta, Pseudoplusia includens, Pyrausta nubilalis, Rachiplusia nu, Schoenobius* spp., for example *Schoenobius bipunctifer, Scirpophaga* spp., for example *Scirpophaga innotata, Scotia segetum, Sesamia* spp., for example *Sesamia inferens, Sparganothis* spp., *Spodoptera* spp., for example *Spodoptera eradiana, Spodoptera exigua, Spodoptera frugiperda, Spodoptera praefica, Stathmopoda* spp., *Stenoma* spp., *Stomopteryx subsecivella, Synanthedon* spp., *Tecia solanivora, Thaumetopoea* spp., *Thermesia gemmatalis, Tinea cloacella, Tinea pellionella, Tineola bisselliella, Tortrix* spp., *Trichophaga tapetzella, Trichoplusia* spp., for example *Trichoplusia ni, Tryporyza incertulas, Tuta absoluta, Virachola* spp.;

from the order of the Orthoptera or Saltatoria, for example *Acheta domesticus, Dichroplus* spp., *Gryllotalpa* spp., for example *Gryllotalpa gryllotalpa, Hieroglyphus* spp., *Locusta* spp., for example *Locusta migratoria, Melanoplus* spp., for example *Melanoplus devastator, Paratlanticus ussuriensis, Schistocerca gregaria;* from the order of the Phthiraptera, for example *Damalinia* spp., *Haematopinus* spp., *Linognathus* spp., *Pediculus* spp., *Phylloxera vastatrix, Phthirus pubis, Trichodectes* spp.;

from the order of the Psocoptera, for example *Lepinotus* spp., *Liposcelis* spp.;

from the order of the Siphonaptera, for example, *Ceratophyllus* spp., *Ctenocephalides* spp., for example *Ctenocephalides canis, Ctenocephalides felis, Pulex irritans, Tunga penetrans, Xenopsylla cheopis*; from the order of the Thysanoptera, for example *Anaphothrips obscurus, Baliothrips biformis, Chaetanaphothrips leeuweni, Drepanothrips reuteri, Enneothrips flavens, Frankliniella* spp., for example *Frankliniella fusca, Frankliniella occidentalis, Frankliniella schultzei, Frankliniella tritici, Frankliniella vaccinii, Frankliniella williamsi, Haplothrips* spp., *Heliothrips* spp., *Hercinothrips femoralis, Kakothrips* spp., *Rhipiphorothrips cruentatus, Scirtothrips* spp., *Taeniothrips cardamomi, Thrips* spp., for example *Thrips palmi, Thrips tabaci;* from the order of the Zygentoma (=*Thysanura*), for example *Ctenolepisma* spp., *Lepisma saccharina, Lepismodes inquilinus, Thermobia domestica;* from the class of the Symphyla, for example *Scutigerella* spp., for example *Scutigerella immaculata*; pests from the phylum of the Mollusca, for example from the class of the *Bivalvia*, for example *Dreissena* spp., and also from the class of the Gastropoda, for example *Arion* spp., for example *Arion ater rufus, Biomphalaria* spp., *Bulinus* spp., *Deroceras* spp., for example *Deroceras laeve, Galba* spp., *Lymnaea* spp., *Oncomelania* spp., *Pomacea* spp., *Succinea* spp.;

plant pests from the phylum of the Nematoda, i.e. phytoparasitic nematodes, in particular *Aglenchus* spp., for example *Aglenchus agricola, Anguina* spp., for example *Anguina tritici, Aphelenchoides* spp., for example *Aphelenchoides arachidis, Aphelenchoides fragariae, Belonolaimus* spp., for example *Belonolaimus gracilis, Belonolaimus longicaudatus, Belonolaimus nortoni, Bursaphelenchus* spp., for example *Bursaphelenchus cocophilus, Bursaphelenchus eremus, Bursaphelenchus xylophilus, Cacopaurus* spp., for example *Cacopaurus pestis, Criconemella* spp., for example *Criconemella curvata, Criconemella onoensis, Criconemella ornata, Criconemella rusium, Criconemella xenoplax* (=Mesocriconema xenoplax), *Criconemoides* spp., for example *Criconemoides ferniae, Criconemoides onoense, Criconemoides ornatum, Ditylenchus* spp., for example *Ditylenchus dipsaci, Dolichodorus* spp., *Globodera* spp., for example *Globodera pallida, Globodera rostochiensis, Helicotylenchus* spp., for example *Helicotylenchus dihystera, Hemicriconemoides* spp., *Hemicycliophora* spp., *Heterodera* spp., for example *Heterodera avenae, Heterodera glycines, Heterodera schachtii, Hirschmaniella* spp., *Hoplolaimus* spp., *Longidorus* spp., for example *Longidorus africanus, Meloidogyne* spp., for example *Meloidogyne chitwoodi, Meloidogyne fallax, Meloidogyne hapla, Meloidogyne incognita, Meloinema* spp., *Nacobbus* spp., *Neotylenchus* spp., *Paralongidorus* spp., *Paraphelenchus* spp., *Paratrichodorus* spp., for example *Paratrichodorus minor, Paratylenchus* spp., *Pratylenchus* spp., for example *Pratylenchus penetrans, Pseudohalenchus* spp., *Psilenchus* spp., *Punctodera* spp., *Quinisulcius* spp., *Radopholus* spp., for example *Radopholus citrophilus, Radopholus similis, Rotylenchulus* spp., *Rotylenchus* spp., *Scutellonema* spp., *Subanguina* spp., *Trichodorus* spp., for example *Trichodorus obtusus, Trichodorus primitivus, Tylenchorhynchus* spp., for example *Tylenchorhynchus annulatus, Tylenchulus* spp., for example *Tylenchulus semipenetrans, Xiphinema* spp., for example *Xiphinema index.*

Formulations

The present invention further relates to formulations and use forms prepared therefrom as pesticides, for example drench, drip and spray liquors, comprising an active compound combination according to the invention. In some cases, the use forms comprise further pesticides and/or adjuvants which improve action, such as penetrants, e.g. vegetable oils, for example rapeseed oil, sunflower oil, mineral oils, for example paraffin oils, alkyl esters of vegetable fatty acids, for example rapeseed oil methyl ester or soya oil methyl ester, or alkanol alkoxylates and/or spreaders, for example alkylsiloxanes and/or salts, for example organic or inorganic ammonium or phosphonium salts, for example ammonium sulphate or diammonium hydrogenphosphate and/or retention promoters, for example dioctyl sulphosuccinate or hydroxypropyl guar polymers and/or humectants, for example glycerol and/or fertilizers, for example ammonium-, potassium- or phosphorus-containing fertilizers.

Customary formulations are, for example, water-soluble liquids (SL), emulsion concentrates (EC), emulsions in water (EW), suspension concentrates (SC, SE, FS, OD), water-dispersible granules (WG), granules (GR) and capsule concentrates (CS); these and further possible formulation types are described, for example, by Crop Life International and in Pesticide Specifications, Manual on development and use of FAO and WHO specifications for pesticides, FAO Plant Production and Protection Papers—173, prepared by the FAO/WHO Joint Meeting on Pesticide Specifications, 2004, ISBN: 9251048576. The formulations, in addition to the active compound combination according to the invention, optionally comprise further agrochemically active compounds.

These are preferably formulations or use forms which comprise auxiliaries, for example extenders, solvents, spontaneity promoters, carriers, emulsifiers, dispersants, frost protectants, biocides, thickeners and/or further auxiliaries, for example adjuvants. An adjuvant in this context is a component which enhances the biological effect of the formulation, without the component itself having any biological effect. Examples of adjuvants are agents which promote retention, spreading, attachment to the leaf surface or penetration.

These formulations are prepared in a known way, for example by mixing the active compound combination according to the invention with auxiliaries such as, for example, extenders, solvents and/or solid carriers and/or other auxiliaries such as, for example, surfactants. The formulations are prepared either in suitable facilities or else before or during application.

The auxiliaries used may be substances suitable for imparting special properties, such as certain physical, technical and/or biological properties, to the formulation of the active compound combination according to the invention, or to the use forms prepared from these formulations (for example ready-to-use pesticides such as spray liquors or seed dressing products).

Suitable extenders are, for example, water, polar and nonpolar organic chemical liquids, for example from the classes of the aromatic and non-aromatic hydrocarbons (such as paraffins, alkylbenzenes, alkylnaphthalenes, chlorobenzenes), the alcohols and polyols (which, if appropriate, may also be substituted, etherified and/or esterified), the ketones (such as acetone, cyclohexanone), the esters (including fats and oils) and (poly)ethers, the unsubstituted and substituted amines, amides, lactams (such as N-alkylpyrrolidones) and lactones, the sulphones and sulphoxides (such as dimethyl sulphoxide), the carbonates and the nitriles.

If the extender used is water, it is also possible to employ, for example, organic solvents as auxiliary solvents. Essentially, suitable liquid solvents are: aromatics such as xylene, toluene or alkylnaphthalenes, chlorinated aromatics or chlorinated aliphatic hydrocarbons such as chlorobenzenes, chloroethylenes or methylene chloride, aliphatic hydrocarbons such as cyclohexane or paraffins, for example mineral oil fractions, mineral and vegetable oils, alcohols such as butanol or glycol and their ethers and esters, ketones such as acetone, methyl ethyl ketone, methyl isobutyl ketone or cyclohexanone, strongly polar solvents such as dimethylformamide or dimethyl sulphoxide, carbonates such as propylene carbonate, butylene carbonate, diethyl carbonate or dibutyl carbonate, or nitriles such as acetonitrile or propanenitrile.

In principle, it is possible to use all suitable solvents. Examples of suitable solvents are aromatic hydrocarbons, such as xylene, toluene or alkylnaphthalenes, chlorinated aromatic or chlorinated aliphatic hydrocarbons, such as chlorobenzene, chloroethylene or methylene chloride, aliphatic hydrocarbons, such as cyclohexane, paraffins, petroleum fractions, mineral and vegetable oils, alcohols, such as methanol, ethanol, isopropanol, butanol or glycol and their ethers and esters, ketones such as acetone, methyl ethyl ketone, methyl isobutyl ketone or cyclohexanone, strongly polar solvents, such as dimethyl sulphoxide, carbonates such as propylene carbonate, butylene carbonate, diethyl carbonate or dibutyl carbonate, nitriles such as acetonitrile or propanenitrile, and also water.

In principle, it is possible to use all suitable carriers. Useful carriers include especially: for example ammonium salts and ground natural minerals such as kaolins, clays, talc, chalk, quartz, attapulgite, montmorillonite or diatomaceous earth, and ground synthetic materials such as finely divided silica, alumina and natural or synthetic silicates, resins, waxes and/or solid fertilizers. Mixtures of such carriers can likewise be used. Useful carriers for granules include: for example crushed and fractionated natural rocks such as calcite, marble, pumice, sepiolite, dolomite, and synthetic granules of inorganic and organic meals, and also granules of organic material such as sawdust, paper, coconut shells, corn cobs and tobacco stalks.

Liquefied gaseous extenders or solvents can also be used. Particularly suitable extenders or carriers are those which are gaseous at ambient temperature and under atmospheric pressure, for example aerosol propellant gases, such as halohydrocarbons, and also butane, propane, nitrogen and carbon dioxide.

Examples of emulsifiers and/or foam-formers, dispersants or wetting agents with ionic or nonionic properties, or mixtures of these surfactants, are salts of polyacrylic acid, salts of lignosulphonic acid, salts of phenolsulphonic acid or naphthalenesulphonic acid, polycondensates of ethylene oxide with fatty alcohols or with fatty acids or with fatty amines, with substituted phenols (preferably alkylphenols or arylphenols), salts of sulphosuccinic esters, taurine derivatives (preferably alkyl taurates), isethionate derivatives, phosphoric esters of polyethoxylated alcohols or phenols, fatty esters of polyols, and derivatives of the compounds containing sulphates, sulphonates and phosphates, for example alkylaryl polyglycol ethers, alkylsulphonates, alkyl sulphates, arylsulphonates, protein hydrolysates, lignosulphite waste liquors and methylcellulose. The presence of a surfactant is advantageous if at least one of the compounds of the active compound combination according to the invention and/or one of the inert carriers is insoluble in water and when the application takes place in water.

It is possible to use colorants such as inorganic pigments, for example iron oxide, titanium oxide and Prussian Blue, and organic dyes such as alizarin dyes, azo dyes and metal phthalocyanine dyes, and nutrients and trace nutrients such as salts of iron, manganese, boron, copper, cobalt, molybdenum and zinc as further auxiliaries in the formulations and the use forms derived therefrom.

Additional components may be stabilizers, such as low-temperature stabilizers, preservatives, antioxidants, light stabilizers or other agents which improve chemical and/or physical stability. Foam formers or antifoams may also be present.

Tackifiers such as carboxymethylcellulose and natural and synthetic polymers in the form of powders, granules or latices, such as gum arabic, polyvinyl alcohol and polyvinyl acetate, or else natural phospholipids such as cephalins and lecithins and synthetic phospholipids may also be present as additional auxiliaries in the formulations and the use forms derived therefrom. Further possible auxiliaries are mineral and vegetable oils.

Optionally, further auxiliaries may be present in the formulations and the use forms derived therefrom.

Examples of such additives include fragrances, protective colloids, binders, adhesives, thickeners, thixotropic agents, penetrants, retention promoters, stabilizers, sequestrants, complexing agents, humectants, spreaders. In general, the active compound combination according to the invention can be combined with any solid or liquid additive commonly used for formulation purposes.

Useful retention promoters include all those substances which reduce the dynamic surface tension, for example dioctyl sulphosuccinate, or increase the viscoelasticity, for example hydroxypropylguar polymers.

Suitable penetrants in the present context are all those substances which are usually used for improving the penetration of agrochemical active compounds into plants. Penetrants are defined in this context by their ability to penetrate from the (generally aqueous) application liquor and/or from the spray coating into the cuticle of the plant and thereby increase the mobility of active compounds in the cuticle. The method described in the literature (Baur et al., 1997, Pesticide Science 51, 131-152) can be used to determine this property. Examples include alcohol alkoxylates such as coconut fatty ethoxylate (10) or isotridecyl ethoxylate (12), fatty acid esters, for example rapeseed oil methyl ester or soya oil methyl ester, fatty amine alkoxylates, for example tallowamine ethoxylate (15), or ammonium and/or phosphonium salts, for example ammonium sulphate or diammonium hydrogenphosphate.

The formulations preferably comprise between 0.00000001 and 98% by weight of the active compound combination according to the invention or, with particular preference, between 0.01% and 95% by weight of the active compound combination according to the invention, more preferably between 0.5% and 90% by weight of the active compound combination according to the invention, based on the weight of the formulation.

The content of the compound of the active compound combination according to the invention in the use forms prepared from the formulations (in particular pesticides) may vary within wide ranges. The concentration of the active compound combination according to the invention in the use forms is usually between 0.00000001 and 95% by weight of the active compound combination according to the invention, preferably between 0.00001 and 1% by weight, based on the weight of the use form. The compounds are employed in a customary manner appropriate for the use forms.

Plants and Plant Parts

All plants and plant parts can be treated in accordance with the invention. Here, plants are to be understood to mean all plants and plant parts such as wanted and unwanted wild plants or crop plants (including naturally occurring crop plants), for example cereals (wheat, rice, triticale, barley, rye, oats), maize, soya bean, potato, sugar beet, sugar cane, tomatoes, pepper, cucumber, melon, carrot, watermelon, onion, lettuce, spinach, leek, beans, *Brassica oleracea* (e.g. cabbage) and other vegetable species, cotton, tobacco, oilseed rape, and also fruit plants (with the fruits apples, pears, citrus fruits and grapevines). Crop plants can be plants which can be obtained by conventional breeding and optimization methods or by biotechnological and genetic engineering methods or combinations of these methods, including the transgenic plants and including the plant varieties which can or cannot be protected by varietal property rights. Plants should be understood to mean all developmental stages, such as seeds, seedlings, young (immature) plants up to mature plants. Plant parts should be understood to mean all parts and organs of the plants above and below ground, such as shoot, leaf, flower and root, examples given being leaves, needles, stalks, stems, flowers, fruit bodies, fruits and seeds, and also tubers, roots and rhizomes. Parts of plants also include harvested plants or harvested plant parts and vegetative and generative propagation material, for example seedlings, tubers, rhizomes, cuttings and seeds.

Treatment according to the invention of the plants and plant parts with the active compound combination according to the invention is carried out directly or by allowing the compounds to act on the surroundings, environment or storage space by the customary treatment methods, for example by immersion, spraying, evaporation, fogging, scattering, painting on, injection and, in the case of propagation material, in particular in the case of seeds, also by applying one or more coats.

As already mentioned above, it is possible to treat all plants and their parts according to the invention. In a preferred embodiment, wild plant species and plant cultivars, or those obtained by conventional biological breeding methods, such as crossing or protoplast fusion, and also parts thereof, are treated. In a further preferred embodiment, transgenic plants and plant cultivars obtained by genetic engineering methods, if appropriate in combination with conventional methods (genetically modified organisms), and parts thereof are treated. The term "parts" or "parts of plants" or "plant parts" has been explained above.

The invention is used with particular preference to treat plants of the respective commercially customary cultivars or those that are in use. Plant cultivars are to be understood as meaning plants having new properties ("traits") and which have been obtained by conventional breeding, by mutagenesis or by recombinant DNA techniques. They can be cultivars, varieties, bio- or genotypes.

Transgenic Plant, Seed Treatment and Integration Events

The transgenic plants or plant cultivars (those obtained by genetic engineering) which are to be treated with preference in accordance with the invention include all plants which, through the genetic modification, received genetic material which imparts particular advantageous useful properties ("traits") to these plants. Examples of such properties are better plant growth, increased tolerance to high or low temperatures, increased tolerance to drought or to levels of water or soil salinity, enhanced flowering performance, easier harvesting, accelerated ripening, higher yields, higher quality and/or a higher nutritional value of the harvested products, better storage life and/or processability of the harvested products. Further and particularly emphasized examples of such properties are increased resistance of the plants against animal and microbial pests, such as against insects, arachnids, nematodes, mites, slugs and snails owing, for example, to toxins formed in the plants, in particular those formed in the plants by the genetic material from *Bacillus thuringiensis* (for example by the genes CryIA(a), CryIA(b), CryIA(c), CryIIA, CryIIIA, CryIIIB2, Cry9c Cry2Ab, Cry3Bb and CryIF and also combinations thereof), furthermore increased resistance of the plants against phytopathogenic fungi, bacteria and/or viruses owing, for example, to systemic acquired resistance (SAR), systemin, phytoalexins, elicitors and also resistance genes and correspondingly expressed proteins and toxins, and also increased tolerance of the plants to certain herbicidally active compounds, for example imidazolinones, sulphonylureas, glyphosate or phosphinothricin (for example the "PAT" gene). The genes which impart the desired traits in question may also be present in combinations with one another in the transgenic plants. Examples of transgenic plants which may be mentioned are the important crop plants, such as cereals (wheat, rice, triticale, barley, rye, oats), maize, soya beans, potatoes, sugar beet, sugar cane, tomatoes, peas and other types of vegetable, cotton, tobacco, oilseed rape and also fruit plants (with the fruits apples, pears, citrus fruits and grapes), with particular emphasis being given to maize, soya beans, wheat, rice, potatoes, cotton, sugar cane, tobacco and oilseed rape. Traits which are particularly emphasized are the increased resistance of the plants to insects, arachnids, nematodes and slugs and snails.

Crop Protection—Types of Treatment

The treatment of the plants and plant parts with the compounds of the active compound combination according to the invention is carried out directly or by action on their surroundings, habitat or storage space using customary treatment methods, for example by dipping, spraying, atomizing, irrigating, evaporating, dusting, fogging, broadcasting, foaming, painting, spreading-on, injecting, watering (drenching), drip irrigating and, in the case of propagation material, in particular in the case of seed, furthermore as a powder for dry seed treatment, a solution for liquid seed treatment, a water-soluble powder for slurry treatment, by incrusting, by coating with one or more coats, etc. It is furthermore possible to apply the active compound combination according to the invention by the ultra-low volume method or to inject the application form or the active compound combination according to the invention itself into the soil.

A preferred direct treatment of the plants is foliar application, i.e. the active compound combination according to the invention is applied to the foliage, where treatment frequency and the application rate should be adjusted according to the level of infestation with the pest in question.

In the case of systemically active compounds, the active compound combination according to the invention also access the plants via the root system. The plants are then treated by the action of the active compound combination according to the invention on the habitat of the plant. This may be done, for example, by drenching, or by mixing into the soil or the nutrient solution, i.e. the locus of the plant (e.g. soil or hydroponic systems) is impregnated with a liquid form of the active compound combination according to the invention, or by soil application, i.e. the active compound combination according to the invention is introduced in solid form (e.g. in the form of granules) into the locus of the plants, or by drip application (often also referred to as "chemigation"), i.e. the liquid application of the active compound combination according to the invention from surface or sub-surface driplines over a certain period of time together with varying amounts of water at defined locations in the vicinity of the plants. In the case of paddy rice crops, this can also be done by metering the active compound combination according to the invention in a solid application form (for example as granules) into a flooded paddy field.

The plants listed can be treated particularly advantageously according to the invention with the active compound combinations according to the invention. The preferred ranges given above in the active compound combinations also apply to the treatment of these plants. Particular emphasis is placed on the plant treatment with the active compound combinations specifically mentioned in the present text.

Formula for the Efficacy of the Combination of Two Compounds

The expected efficacy of a given combination of two compounds is calculated as follows (see Colby, S.R., "Calculating Synergistic and antagonistic Responses of Herbicide Combinations", Weeds 15, pp. 20-22, 1967):

If
X is the efficacy expressed in % mortality of the untreated control for test compound A at a concentration of m ppm or m g/ha,
Y is the efficacy expressed in % mortality of the untreated control for test compound B at a concentration of n ppm or n g/ha,
E is the efficacy expressed in % mortality of the untreated control using the mixture of A and B at m and n ppm respectively m and n g/ha,
then is $$E = X + Y - \frac{X \times Y}{100}$$

If the observed insecticidal efficacy of the combination is higher than the one calculated as "E", then the combination of the two compounds is more than additive, i.e., there is a synergistic effect.

Example A

*Aphis gossypii*—Spray Test
Solvent: 7 parts by weight of dimethylformamide
Emulsifier: alkylaryl polyglycol ether To produce a suitable preparation of active compound, 1 part by weight of active compound is mixed with the stated amount of solvent and is diluted with water, containing an emulsifier concentration of 1000 ppm, to the desired concentration. Further test concentrations are prepared by dilution with emulsifier containing water. Ammonium salt and/ or penetration enhancer in a dosage of 1000 ppm are added to the desired concentration if necessary.

Cotton leaves (*Gossypium hirsutum*) which are heavily infested with the cotton aphid (*Aphis gossypii*) are treated by being sprayed with the preparation of the active compound of the desired concentration.

After the specified period of time the mortality in % is determined. 100% means all the aphids have been killed; 0% means none of the aphids have been killed. The mortality values determined thus are recalculated using the Colby-formula (see sheet 1).

According to the present application in this test e.g. the following combination shows a synergistic effect in comparison to the single compounds:

TABLE A

| Aphis gossypii-spray test | | | |
|---|---|---|---|
| Compound | Concentration in ppm | Efficacy in % after 6 days | |
| Ex.-No. I-2 | 1 | 5 | |
| Requiem (Terpenoid blend EC152,3) | 1000 | 10 | |
| Ex. No. I-2 + Requiem (1:1000) According to the invention | 1 + 1000 | obs.* 50 | cal.** 14.5 |

*obs. = observed efficacy;
**cal. = efficacy calculated with Colby-formula

Example B

*Myzus persicae*—Spray Test
Solvent: 7 parts by weight of dimethylformamide
Emulsifier: alkylaryl polyglycol ether To produce a suitable preparation of active compound, 1 part by weight of active compound is mixed with the stated amount of solvent and is diluted with water, containing an emulsifier concentration of 1000 ppm, to the desired concentration. Further test concentrations are prepared by dilution with emulsifier containing water. Ammonium salt in a dosage of 1000 ppm is added to the desired concentration.

Cabbage leaves (*Brassica oleracea*) which are heavily infested by the green peach aphid (*Myzus persicae*) are treated by being sprayed with the preparation of the active compound of the desired concentration.

After the specified period of time mortality in % is determined. 100% means all the aphids have been killed; 0% means none of the aphids have been killed. The mortality values determined thus are recalculated using the Colby-formula (see sheet 1).

According to the present application in this test e.g. the following combinations show a synergistic effect in comparison to the single compounds:

TABLE B

| Myzus persicae-spray test | | | |
|---|---|---|---|
| Compound | Concentration in ppm | Efficacy in % after 6 days | |
| Ex.-No. I-2 | 8 | 25 | |
| (R)-(+)-limonene 97% | 1600 | 0 | |
| Ex.-No. I-2 + (R)-(+)-limonene (1:200) According to the invention | 8 + 1600 | obs.* 60 | cal.** 25 |

*obs. = observed efficacy;
**cal. = efficacy calculated with Colby-formula

The invention claimed is:

1. An active compound combination comprising at least one compound of formula (I-2)

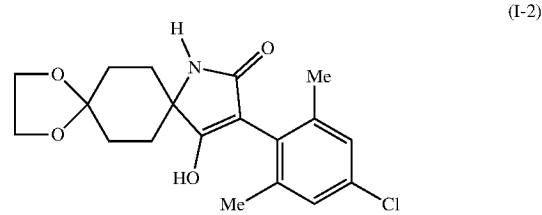 [SMILES: Cc1cc(Cl)cc(C)c1C1=C(O)C2(CCC3(CC2)OCCO3)NC1=O]

(I-2)

and at least one active compound of group (II) which is selected from the group consisting of
limonene and a combination of three terpenes comprising α-terpinene at a concentration of about 10%, p-cymene at a concentration of about 3.75% and limonene at a concentration of about 3% as pesticidally active ingredients.

2. The active compound combination of claim 1, wherein the at least one active compound of group (II) is the combination of three terpenes.

3. The active compound combination of claim 1, wherein the at least one active compound of group (II) is limonene.

4. A product comprising an active compound of claim 1 for controlling animal pests.

5. The product of claim 4, wherein the animal pest is an insect or arachnid or acarid pest.

6. A product comprising an active compound combination of claim 1 for controlling microbial pests.

7. A product comprising an active compound combination of claim 1 for controlling nematodes.

8. A product comprising an active compound combination as defined in claim 1 as a plant strengthening agent.

9. A product comprising an active compound combination as defined in claim 1 useful for application to transgenic plants.

10. A method for controlling one or more animal and/or microbial pests, comprising allowing an active compound combination of claim 1 to act on said animal or microbial pests and/or a habitat thereof.

11. The method of claim 10, wherein the animal pest is an insect or arachnid or acarid pest.

12. A process for preparing a crop protection agent, comprising mixing an active compound combination of claim 1 with one or more extenders and/or surfactants.

13. A product comprising an active compound combination of claim 1 for treating plants or parts thereof selected from the group consisting of citrus, pome fruits, stone fruits, tropical fruits, nuts, berries, vegetables, cotton, soybean, grape, tea, coffee, maize, rice and ornamentals.

* * * * *